US011112601B2

(12) United States Patent
Sharp

(10) Patent No.: US 11,112,601 B2
(45) Date of Patent: Sep. 7, 2021

(54) HEAD MOUNTED DISPLAY INCLUDING A REVERSE-ORDER CROSSED PANCAKE LENS

(71) Applicant: Facebook Technologies, LLC, Menlo Park, CA (US)

(72) Inventor: Gary Dean Sharp, Boulder, CO (US)

(73) Assignee: Facebook Technologies, LLC, Menlo Park, CA (US)

( * ) Notice: Subject to any disclaimer, the term of this patent is extended or adjusted under 35 U.S.C. 154(b) by 192 days.

(21) Appl. No.: 16/160,128

(22) Filed: Oct. 15, 2018

(65) Prior Publication Data
US 2019/0377176 A1 Dec. 12, 2019

Related U.S. Application Data

(60) Provisional application No. 62/682,041, filed on Jun. 7, 2018.

(51) Int. Cl.
G02B 27/00 (2006.01)
G02B 27/28 (2006.01)
(Continued)

(52) U.S. Cl.
CPC ....... *G02B 27/0018* (2013.01); *G02B 5/3058* (2013.01); *G02B 5/3066* (2013.01);
(Continued)

(58) Field of Classification Search
CPC ............. G02B 27/0018; G02B 5/3058; G02B 5/3066; G02B 5/3083; G02B 27/0025;
(Continued)

(56) References Cited

U.S. PATENT DOCUMENTS 3,183,763 A * 5/1965 Koester .................. G01N 21/21
356/33
3,432,225 A * 3/1969 Rock .................... C03C 17/3417
359/588
(Continued)

FOREIGN PATENT DOCUMENTS

JP H11-237584 A 8/1999
JP 2009-238363 A 10/2009
(Continued)

OTHER PUBLICATIONS

Pancharatnam "Achromatic Combinations of Birefringent Plates, Part II. An Achromatic Quarter-Wave Plate" Proceedings of the Indian Academy of Sciences pp. 137-144 (Year: 1955).*
(Continued)

*Primary Examiner* — George G King
(74) *Attorney, Agent, or Firm* — FisherBroyles, LLP

(57) ABSTRACT

In various embodiments, a pancake lens block may include (i) a first compound retarder comprising a first plurality of retarders oriented to a plurality of first axes of orientation, respectively, where the first compound retarder is configured to selectively transmit a portion of the emitted light, (ii) a partial reflector that receives the portion of emitted light from the first compound retarder and transmits the portion of the emitted light, (iii) a second compound retarder comprising a second plurality of retarders oriented to a plurality of second axes of orientation that are substantially orthogonal to the respective plurality of first axes of orientation, and (iv) a reflective polarizer configured to reflect the portion of the emitted light selectively transmitted by the second compound retarder back to the second compound retarder.

18 Claims, 13 Drawing Sheets

(51) Int. Cl.
*G02B 5/30* (2006.01)
*G02B 27/01* (2006.01)
*G02B 27/09* (2006.01)

(52) U.S. Cl.
CPC ....... *G02B 5/3083* (2013.01); *G02B 27/0025* (2013.01); *G02B 27/0037* (2013.01); *G02B 27/0093* (2013.01); *G02B 27/0172* (2013.01); *G02B 27/0983* (2013.01); *G02B 27/283* (2013.01); *G02B 27/286* (2013.01)

(58) Field of Classification Search
CPC ............ G02B 27/0037; G02B 27/0093; G02B 27/0172; G02B 27/0983; G02B 27/283; G02B 27/286
See application file for complete search history.

(56) References Cited

U.S. PATENT DOCUMENTS

| | | | |
|---|---|---|---|
| 5,349,379 | A | 9/1994 | Eichenlaub |
| 5,410,345 | A | 4/1995 | Eichenlaub |
| 5,428,366 | A | 6/1995 | Eichenlaub |
| 5,966,242 | A * | 10/1999 | Yamanaka ......... G02B 27/0172 359/618 |
| 5,973,760 | A | 10/1999 | Dehmlow |
| 6,583,930 | B1 | 6/2003 | Schrenk et al. |
| 7,662,436 | B1 | 2/2010 | Wei et al. |
| 8,780,285 | B1 | 7/2014 | Stuppi et al. |
| 9,110,245 | B2 | 8/2015 | Derks et al. |
| 9,513,420 | B2 | 12/2016 | Derks et al. |
| 2002/0169267 | A1* | 11/2002 | Minakuchi ............ C08F 232/00 526/282 |
| 2004/0125291 | A1* | 7/2004 | Kawahara ............ G02B 5/3033 349/117 |
| 2005/0179048 | A1 | 8/2005 | Yamanaka et al. |
| 2006/0146682 | A1* | 7/2006 | Sharp ................ G11B 7/22 369/112.01 |
| 2006/0268207 | A1* | 11/2006 | Tan .................... G02F 1/133632 349/117 |
| 2007/0070508 | A1 | 3/2007 | Ruhle et al. |
| 2007/0159582 | A1 | 7/2007 | Kwok et al. |
| 2007/0279553 | A1* | 12/2007 | Yoda .................... G02F 1/13363 349/96 |
| 2008/0297898 | A1 | 12/2008 | Martin |
| 2010/0177113 | A1 | 7/2010 | Gay et al. |
| 2011/0193814 | A1 | 8/2011 | Gay et al. |
| 2012/0120365 | A1 | 5/2012 | Legerton et al. |
| 2013/0057958 | A1 | 3/2013 | Minoura et al. |
| 2016/0131920 | A1* | 5/2016 | Cook .................... G02B 27/283 359/489.07 |
| 2017/0045737 | A1 | 2/2017 | Cammenga et al. |
| 2017/0068029 | A1 | 3/2017 | Yun et al. |
| 2017/0068096 | A1 | 3/2017 | Ouderkirk et al. |
| 2017/0168302 | A1 | 6/2017 | McDowall et al. |
| 2017/0255015 | A1 | 9/2017 | Geng et al. |
| 2017/0276960 | A1* | 9/2017 | Osterman ........... G02F 1/13439 |
| 2017/0358136 | A1 | 12/2017 | Gollier et al. |
| 2018/0031835 | A1 | 2/2018 | Hoppe |
| 2018/0039052 | A1 | 2/2018 | Khan et al. |
| 2018/0059296 | A1 | 3/2018 | Ouderkirk et al. |
| 2018/0101020 | A1 | 4/2018 | Gollier et al. |
| 2018/0120579 | A1 | 5/2018 | Gollier et al. |
| 2018/0149862 | A1 | 5/2018 | Kessler et al. |

FOREIGN PATENT DOCUMENTS

| | | |
|---|---|---|
| JP | 2012-247748 A | 12/2012 |
| JP | 5147910 B2 | 2/2013 |
| JP | 2013-200482 A | 10/2013 |
| JP | 2015-184629 A | 10/2015 |
| WO | 94/06249 A1 | 3/1994 |
| WO | 2018/093633 A1 | 5/2018 |

OTHER PUBLICATIONS

International Search Report and Written Opinion received for PCT Application Serial No. PCT/US2018/064366 dated Apr. 3, 2019, 18 pages.

Escuti et al., "Geometric-Phase Holograms", Optics & Photonics News, Feb. 2016, 8 pages.

Pancharatnam, S., "Generalized Theory of Interference, and its Applications", Part I, Coherent Pencils, Memoir No. 88 of the Raman Research Institute, Oct. 30, 1956, pp. 247-262, Bangalore, India.

3M Optical Systems, "Vikuiti Dual Brightness Enhancement Film—Matte (DBEF-M)", URL: multimedia.3m.com/mws/media/152671O/vikuiti-tm-dbef-m.pdf, 2008, 4 pages.

International Search Report and Written Opinion received for PCT Application Serial No. PCT/US2018/064362 dated Mar. 29, 2019, 11 pages.

International Search Report and Written Opinion received for PCT Application Serial No. PCT/US2018/064363 dated Mar. 28, 2019, 18 pages.

Sharp, Gary Dean, "Reverse-Order Crossed Pancake Lens With Azimuthal Compensation", U.S. Appl. No. 16/159,747, filed Oct. 15, 2018, 85 pages.

Sharp, Gary Dean, "Reverse-Order Crossed Pancake Lens With a Shaped Polarizer", U.S. Appl. No. 16/159,752, filed Oct. 15, 2018, 87 pages.

Sharp, Gary Dean, "Reverse-Order Crossed Pancake Lens With Index Gradient Structure", U.S. Appl. No. 16/159,757, filed Oct. 15, 2018, 91 pages.

Extended European Search Report received for EP Patent Application Serial No. 18921861.3 dated Jun. 11, 2021, 13 pages.

Extended European Search Report received for EP Patent Application Serial No. 18921615.3 dated Jun. 18, 2021, 11 pages.

Extended European Search Report received for EP Patent Application Serial No. 18921577.5 dated Jun. 7, 2021, 13 pages.

Cai et al., "Recent advances in antireflective surfaces based on nanostructure arrays", Mater. Horiz , vol. 2, No. 1, Jan. 1, 2015, pp. 37-53.

Lee, Michelle, "Moth Eyes: A New Vision for Light-Harnessing Efficiency", Remarkable Natural Material Surfaces and Their Engineering Potential, Springer, Jan. 1, 2014, pp. 79-89.

Extended European Search Report received for EP Patent Application Serial No. 18921964.5 dated Jun. 28, 2021, 15 pages.

Li et al., "Liquid Crystalline Epoxy Resins", Chapter 1, Liquid Crystalline Polymers, Springer, Jan. 1, 2016, pp. 1-17,.

Wikipedia, "Pancake lens", URL: https://en.wikipedia.org/w/index.php?title=Pancake_lens&oldid=822604383, Jan. 27, 2018, 4 pages.

Notice of Allowance received for U.S. Appl. No. 16/159,747 dated Jul. 19, 2021, 20 pages.

Notice of Allowance received for U.S. Appl. No. 16/159,752 dated Jul. 15, 2021, 22 pages.

* cited by examiner

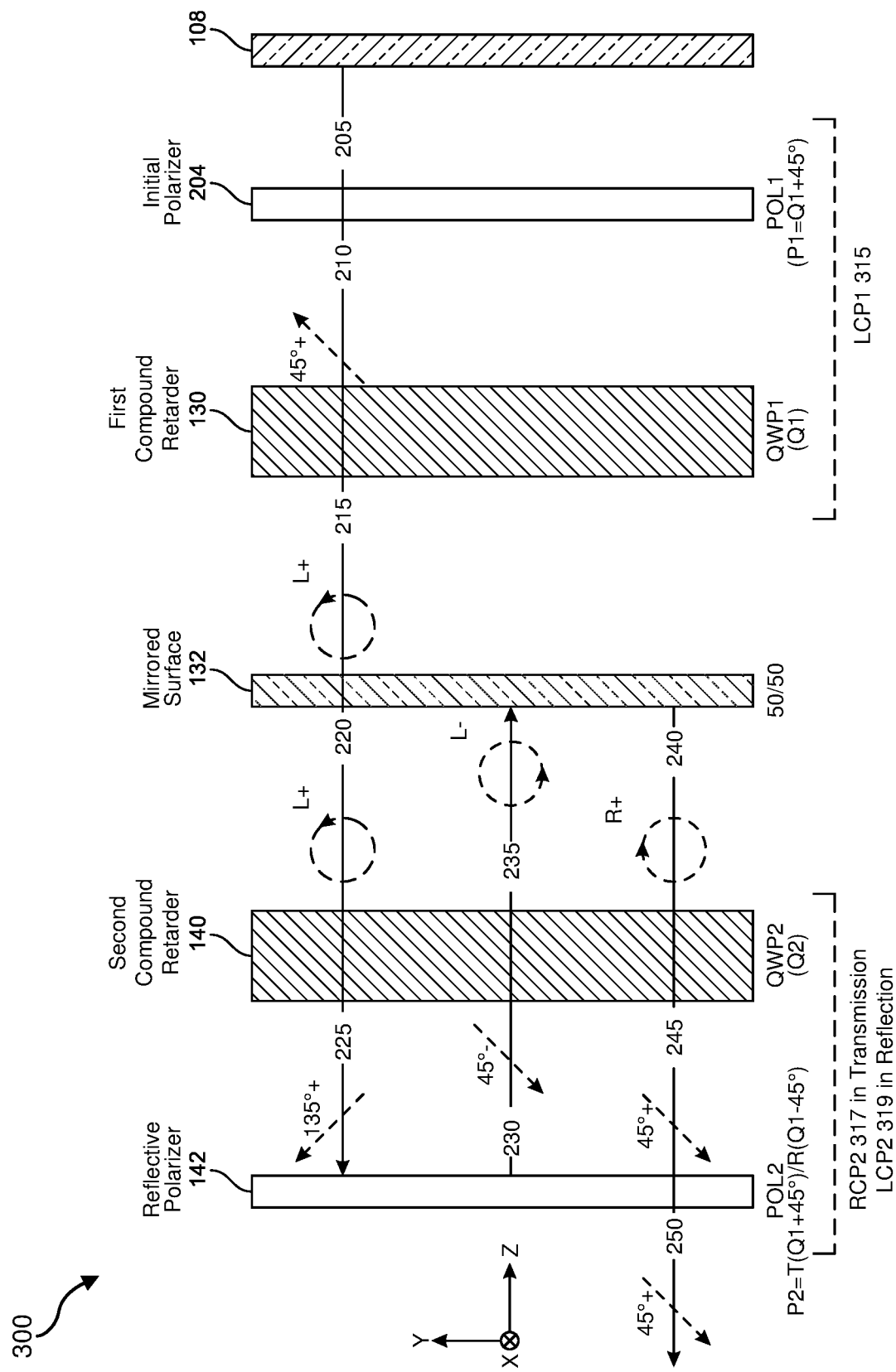

HEAD MOUNTED DISPLAY INCLUDING A REVERSE-ORDER CROSSED PANCAKE LENS

CROSS REFERENCE TO RELATED APPLICATION

This application is a non-provisional utility application which claims the benefit of U.S. Provisional Application No. 62/682,041 filed 7 Jun. 2018, the disclosure of which is incorporated, in its entirety, by this reference.

BACKGROUND

In a head-mounted display (HMD), a user's eye typically occupies a region of space generally referred to as an eye box, and a respective eye box may be provided for each of the user's eyes. HMDs often display and direct content to the eye boxes, for example, using one or more optical elements. Unfortunately, light reflected between the various optical elements within the HMD may generate parasitic light in the process. This may lead to reduced contrast in the content being presented to the user. In particular, systems with polarizing elements may introduce parasitic light and/or ghost images that may reduce image quality and, thus, the user's overall experience.

SUMMARY

As will be described in greater detail below, the instant disclosure describes various display apparatuses and systems including pancake lenses and corresponding methods for manufacturing the same. In various embodiments, a pancake lens block may be described. The pancake lens make include (i) a first compound retarder including a first plurality of retarders oriented to a plurality of first axes of orientation, respectively, where the first compound retarder may be configured to selectively transmit a portion of radiation from a radiation source, (ii) a partial reflector that receives the portion of radiation from the first compound retarder and transmits the portion of radiation, (iii) a second compound retarder including a second plurality of retarders oriented to a plurality of second axes of orientation that may be substantially orthogonal to the respective plurality of first axes of orientation, where the second compound retarder may be configured to selectively transmit the portion of radiation from the partial reflector, and (iv) a reflective polarizer configured to reflect the portion of radiation selectively transmitted by the second compound retarder back to the partial reflector through the second compound retarder, where the partial reflector reflects a second portion of the radiation from the second compound retarder back to the reflective polarizer.

In another embodiment, the portion of radiation selectively transmitted from the first compound retarder may have a circular polarization state. In one aspect, the first plurality of retarders includes a first quarter-wave retarder and a second quarter-wave retarder that together serve as a half-wave retarder to a third quarter-wave retarder. In another embodiment, the first quarter-wave retarder may have an axis of orientation of approximately 14.8 degrees, the second quarter-wave retarder may have an axis of orientation of approximately 14.8 degrees, and the third quarter-wave retarder may have an axis of orientation of approximately 73.7 degrees. In one aspect, the second plurality of retarders includes a first quarter-wave retarder having an axis of orientation of approximately −16.3 degrees, a second quarter-wave retarder having an axis of orientation of approximately −75.2 degrees, and a third quarter-wave retarder having an axis of orientation of approximately −75.2 degrees. In one aspect, the portion of radiation may include normally incident radiation, and a composite Jones matrix associated with the first compound retarder and the second compound retarder may include an identity matrix.

In one aspect, the at least one of the first compound retarder or the second compound retarder may include a dispersion-controlled quarter-wave retarder. In one aspect, the dispersion-controlled quarter-wave retarder may include a co-polymer of polycarbonate and polystyrene. In one aspect, at least one of the first compound retarder or the second compound retarder may include a material having a low stress optical coefficient. In one aspect, the material may include a cyclic olefin material.

In one aspect, the first compound retarder may have a first surface facing a display and a second surface facing the partial reflector, and the second compound retarder may have a first surface facing the partial reflector and a second surface facing the reflective polarizer, and where the pancake lens block further may include a first c-plate coupled to the second surface of the first compound retarder and a second c-plate coupled to the first surface of the second compound retarder.

In another embodiment, the first c-plate may have a first retardation value and the second c-plate may have a second retardation value that may be substantially equal to the first retardation value. In one aspect, the first retardation value and the second retardation value increase with an increasing number of components in the first compound retarder and an increasing number of components in the second compound retarder, respectively.

In one aspect, the first compound retarder may be coupled to a display polarizer of a display. In another embodiment, the display polarizer may include a linear polarizer and a polarization axis of the display polarizer may be matched to a polarization axis of the first compound retarder. In one aspect, the display polarizer includes a circular polarizer and the circular polarizer may be coupled to the first compound retarder.

In various aspects, a head mounted display (HMD) may include an electronic display configured to emit light and a pancake lens block. The pancake lens block may include (i) a first compound retarder including a first plurality of retarders oriented to a plurality of first axes of orientation, respectively, where the first compound retarder may be configured to selectively transmit a portion of the emitted light, (ii) a partial reflector that receives the portion of emitted light from the first compound retarder and transmits the portion of the emitted light, (iii) a second compound retarder including a second plurality of retarders oriented to a plurality of second axes of orientation that may be substantially orthogonal to the respective plurality of first axes of orientation, where the second compound retarder may be configured to selectively transmit the portion of emitted light from the partial reflector, and (iv) a reflective polarizer configured to reflect the portion of the emitted light selectively transmitted by the second compound retarder back to the second compound retarder, where the partial reflector reflects a second portion of the emitted light from the second compound retarder back to the reflective polarizer in the orthogonal polarization state.

In another embodiment, at least one of the first compound retarder or the second compound retarder may include a dispersion-controlled quarter-wave retarder. Further, the first compound retarder may have a first surface facing the electronic display and a second surface facing the partial reflector, and the second compound retarder may have a first surface facing the partial reflector and a second surface facing the reflective polarizer. Moreover, the pancake lens block further may include a first c-plate coupled to the second surface of the first compound retarder and a second c-plate coupled to the first surface of the second compound retarder.

A corresponding method of assembling a pancake lens block may include positioning a partial reflector adjacent to a first compound retarder across an air gap. The first compound retarder may include a first plurality of retarders oriented to a plurality of first axes of orientation, respectively, where the first compound retarder may be configured to selectively transmit a portion of radiation, Additionally, the partial reflector may be configured to receive the portion of radiation from the first compound retarder and transmit the portion of radiation. The method may also include (i) providing a second compound retarder adjacent to the partial reflector, the second compound retarder including a second plurality of retarders oriented to a plurality of second axes of orientation that may be substantially orthogonal to the respective plurality of first axes of orientation, where the second compound retarder may be configured to selectively transmit the portion of radiation from the partial reflector, and (ii) providing a reflective polarizer adjacent to the second compound retarder, the reflective polarizer configured to reflect the portion of the radiation selectively transmitted by the second compound retarder back to the second compound retarder, where the partial reflector reflects a second portion of the radiation from the second compound retarder back to the reflective polarizer.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF FIGURES AND APPENDICES

The accompanying figures and appendices illustrate a number of exemplary embodiments and are a part of the specification. Together with the following description, these figures and appendices demonstrate and explain various principles of the instant disclosure.

FIG. 3A shows an exemplary pancake lens block with polarizing elements that have no orientation specification between the display polarizing components and the pancake lens block polarizing components, in accordance with one embodiment.

Figure 1:
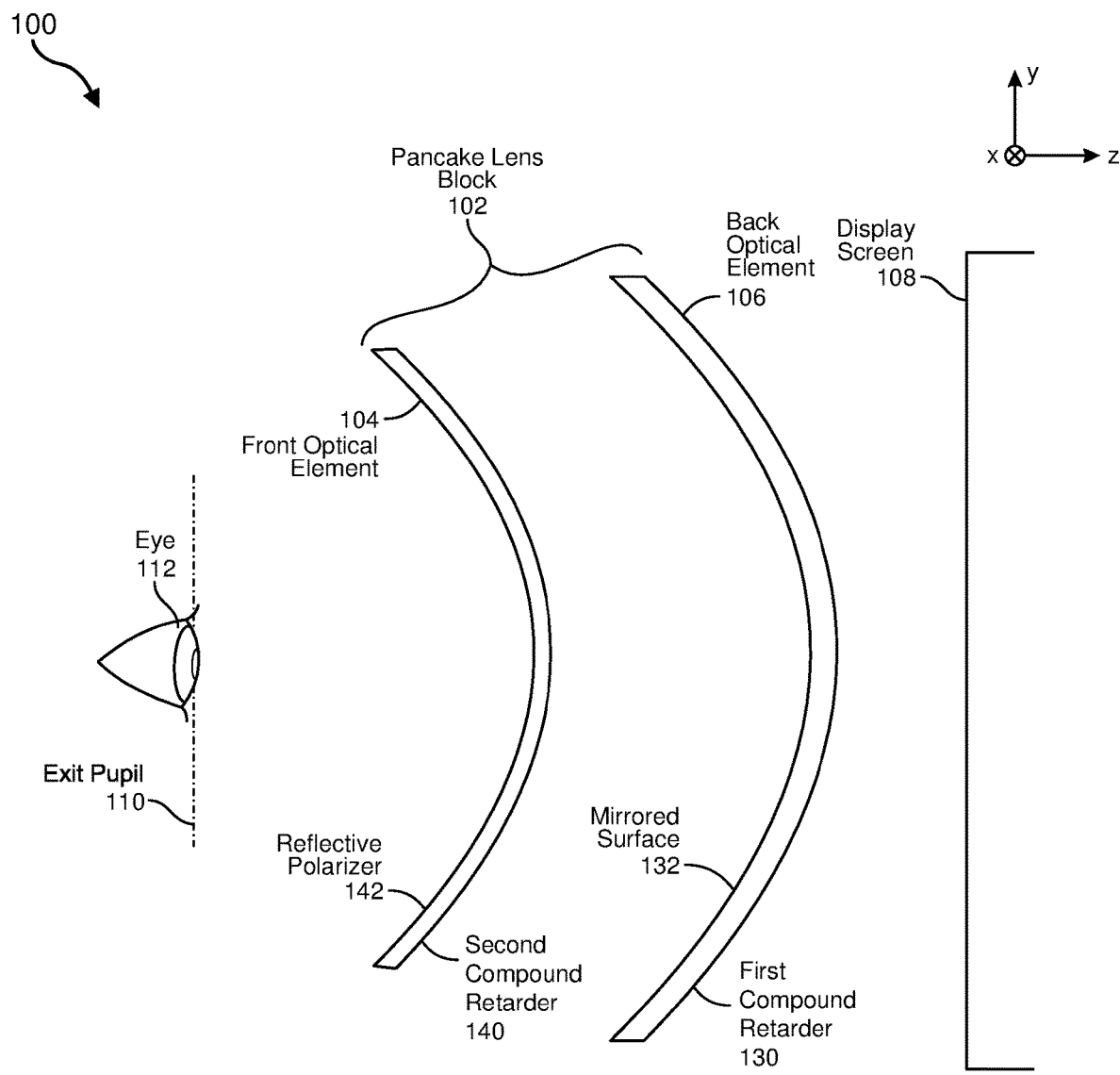
FIG. 1 is an example pancake lens block, in accordance with one embodiment.

Throughout the figures and appendices, identical reference characters and descriptions indicate similar, but not necessarily identical, elements. While the exemplary embodiments described herein are susceptible to various modifications and alternative forms, specific embodiments have been shown by way of example in the appendices and will be described in detail herein. However, the exemplary embodiments described herein are not intended to be limited to the particular forms disclosed. Rather, the instant disclosure covers all modifications, equivalents, and alternatives falling within this disclosure.

DETAILED DESCRIPTION OF EXEMPLARY EMBODIMENTS

The present disclosure is generally directed to enhancing images from electronic displays, and more specifically to reducing light leakage within an optical system including electronic displays.

In some embodiments, a reverse-order crossed (ROC) architecture for a pancake lens may include a first polarizer (e.g., linear polarizer), a first compound retarder (e.g., a retarder including multiple individual retarders, such as quarter-wave plates (QWPs)), a partial reflector, a second compound retarder (e.g., a retarder including multiple QWPs), and a reflective (e.g., beam-splitting) polarizer. In some embodiments, the term "compound retarder" may refer to an engineered stack of retarders (e.g., linear retarders), where the retardation and orientation of each layer in the stack may be designed to transform radiation (e.g., light) of a particular input polarization to radiation of a prescribed output polarization as a function of wavelength. Light received (e.g., from a display) may propagate through the pancake lens, where the light may undergo multiple controlled reflections and transmissions achieved by coordinating changes in polarization of light through these optical elements. In some embodiments, the first compound retarder and the second compound retarder may include a plurality of retarders (e.g., retarders including QWPs), for example, two, three, four, or more retarders.

The term "compound retarder" can be used to describe an engineered stack of linear retarders that may serve to generate a specified polarization transformation as a function of wavelength. In some instances, the compound retarder may serve to convert a uniform linear state of polarization (SOP) to a uniform circular SOP. The term may be used to encompass all such structures, without the additional constraint that the structure behave as a composite linear retarder (i.e. that it have linear eigen-polarizations).

In some embodiments, to prevent parasitic light (e.g., ghost images) from degrading image quality, an optical axis (e.g., a fast axis or a slow axis) of the second compound retarder may be oriented approximately ninety degrees (orthogonal) relative to the optical axis of the first compound retarder (i.e., corresponding to the "cross" configuration designation of the reverse-order crossed pancake lens block). Further, the first compound retarder and the second compound retarder may each include multiple retarders (e.g., three QWPs) arranged in a stack. In some embodiments, the order of the multiple retarding elements (e.g., QWPs) included in the first compound retarder-stack and the order for the multiple retarding elements for the second compound retarder-stack may be the reverse of one another, yielding the "reverse-order" configuration nomenclature of the ROC. For example, first, second, and third QWPs (e.g., labeled as A, B, and C) in the first compound retarder may map to third, second, and first QWPs (e.g., labeled as C, B, and A) in the second compound retarder.

In some embodiments, the ROC architecture may be implemented independently of the retardation magnitude or the axis of orientation of any given retarding element (e.g., any given QWP) of the compound retarding elements. In some embodiments, the optical axis of orientation of the retarders (e.g., the QWPs) in the compound retarders may be the fast axis (e.g., corresponding to the optical axis of orientation for a retarder including a negative uniaxial material) or the slow axis (e.g., corresponding to the optical axis of orientation for a retarder including a positive uniaxial material), or some other axis by which the retarding elements are oriented relative to each other. The compound retarders may additionally exhibit the same or similar behavior with respect to retardance variation versus wavelength and incidence angle.

In some embodiments, the ROC architecture may serve to change a spectral shape of a transformation function that light undergoes during the light's traversal through the first and second compound retarders of the pancake lens block. Further, while the ROC architecture described herein may be designed for visible light, in other embodiments, the transformation function of a pancake lens block may also be designed for radiation of different wavelength ranges (e.g., infrared radiation, ultraviolet radiation, and the like).

In another embodiment, a first compound retarder may be considered as a "black box" (e.g., a device which can be viewed in terms of its inputs and outputs) that may convert linearly polarized light to circularly polarized light in a range (e.g., visible range) of wavelengths. Moreover, a similarly designed second compound retarder having a compound optical axis that is rotated by approximately ninety degrees with respect to the first compound retarder compound optical axis may be used in the pancake lens block to convert the light traversed through the first compound retarder and the second compound retarder back to linearly polarized light having the same orientation as the orientation of the originally incident light on the first compound retarder.

In another embodiment, the first compound retarder may be a contrast determining element that may be sensitive to small optical imperfections. Therefore, the output of the first compound retarder may not be light having circular polarization, but rather, may be light having elliptical polarization, which may lead to compounding optical effects in the pancake lens. In some embodiments, the greater the number of components (e.g., five QWPs, or any odd number of QWPs) in a given compound retarder, the better the compound retarder may transform the linearly polarized light to circularly polarized light for light having normal incidence. For such a multi-layer (e.g., five layer) compound retarder, a second, substantially similar compound retarder in a ROC configuration placed in series with the multi-layer compound retarder may be able to transform the SOP of the originally incident light and thereby restore the original linear polarization of the light. However, when the incident light on the multi-layer compound retarders in the ROC configuration is off-normal, such multi-layer compound retarders may distort the polarization state of the light.

In another embodiment, for an ROC pancake lens block including two compound retarders in series, the two compound retarders may have no net effect on the polarization state of light at the output of the two compound retarders if the interim polarization state (e.g., the polarization state of the light at the output of the first compound retarder and before the input of the second compound retarder) is circularly polarized, assuming normally incident light at the input of the first compound retarder. If the interim polarization state of the light is not circular polarization, the two compound retarders may not fully restore the linear polarization state of the light at the output of the second compound retarder, leading to reduced contrast in the pancake lens block. In some embodiments, a pair of compound retarders in the ROC arrangement may restore the input state-of-polarization of light at normal incidence, at least in part because the composite Jones matrix corresponding to the compound retarders in the ROC arrangement is an identity matrix. Further, the composite Jones matrix may be the identity matrix regardless of the transformation associated with the first compound retarder or the corresponding number of retarders (e.g., number of QWPs), optical axes of orientation of the retarders (e.g., angles of the QWPs), and the retardation values of the retarders (e.g., retardation values of the QWPs) used in the first compound retarder. In some embodiments, a deviation from the ROC relationship between the compound retarders may result in a departure from the identity matrix for the composite Jones matrix associated with the ROC pancake lens block.

In some embodiments, the retardances of the constituent elements (e.g., constituent QWPs) for each of the compound retarders may be equal, and the axes of orientations of the constituent elements (e.g., axes of orientation of the constituent QWPs) of the two compound retarders may be crossed (e.g., made orthogonal to one another) between the two compound retarders. In some embodiments, the polarization state of light may be a circular polarization at the midpoint (e.g., the output of the first compound retarder and the input of the second compound retarder). Further, the polarization state (e.g., linear polarization) of the light incident on the first compound retarder may be restored at the output of the second compound retarder (e.g., the same linear polarization). In another embodiment, a trade-off in the design of the ROC pancake lens architecture may exist in that designs that may accommodate for wide-angles of incidence may require small component counts (e.g., three QWPs in each compound retarder), while designs that are optimized for achromaticity and the generation of circular polarization at the midpoint between compound retarders may favor high component counts (e.g., greater than three QWPs in each compound retarder).

FIG. 1 shows a cross sectional view 100 of an embodiment of pancake lens block 102 in accordance with one embodiment. In another embodiment, pancake lens block 102 may be configured to provide a folded optical path by utilizing polarizing optical components and providing optical power in a compact optical system. Pancake lens block 102, in some embodiments, may be part of a head-mounted display and may include front optical element 104 and back optical element 106 that focuses light from electronic display screen 108 to exit pupil 110 where an eye 112 of a user is positioned when viewing content on electronic display screen 108.

For purposes of illustration, FIG. 1 shows a cross section 100 of pancake lens block 102 associated with a single eye 112, but another pancake lens assembly, separate from pancake lens block 102 shown in FIG. 1, may provide altered image light to another eye of the user. Some embodiments of the pancake lens have different components than those described here. Similarly, in some cases, functions may be distributed among the components in a different manner than is described here.

Light emitted from electronic display 108 may be linearly polarized. In some embodiments, electronic display 108 includes one or more linear polarizers (POL1, to be shown and described in connection with FIG. 2, below) that linearly polarize light emitted from electronic display 108. Alternatively, light emitted from light emitting components (e.g., light-emitting diodes, LEDs) may be emitted as linearly polarized light.

Pancake lens block 102 illustrated in FIG. 1 includes front optical element 104 and back optical element 106. One or more surfaces of front optical element 104 and back optical element 106 may be shaped, for example, to correct for one or more optical aberrations, such as field curvature. For example, one or more surfaces of front optical element 104 may be shaped to be spherically concave (e.g., a portion of a sphere), spherically convex, planar, a rotationally symmetric sphere, a freeform shape, or some other shape that mitigates one or more optical aberrations, such as field curvature. In some embodiments, the shape of one or more surfaces of front optical element 104 and back optical element 106 may be designed to additionally correct for other forms of optical aberration. In some embodiments, one or more of the optical elements within pancake lens block 102 may have one or more coatings, such as anti-reflective coatings, for example, to reduce ghost images and to enhance contrast in the pancake lens block 102.

Back optical element 106 may include a first compound retarder 130 and a mirrored surface 132 (also referred to as partial reflector herein). In this example, first compound retarder 130 may include QWPs (e.g., three QWPs) that transform the polarization of received light. The first compound retarder 130 may have a compound optic axis oriented at approximately 45 degrees relative to incident linearly polarized light (e.g., from the electronic display 108 and/or from a linear polarizer associated with the electronic display 108) such that first compound retarder 130 converts linearly polarized light into circularly polarized light. As noted, the first compound retarder 130 may include multiple retarders, such as QWPs. In another embodiment, QWPs may be made of birefringent materials such as quartz, organic stretched material sheets, or liquid crystal. In one embodiment, the QWPs may be designed to be optimized such that the dependence of the retardance induced by a given retarder remains close to a quarter of a wave independently of the wavelength and the angle of incidence on the QWP.

In some embodiments, the compound retarders (e.g., first compound retarder 130 and second compound retarder 140, to be discussed below) may include three QWPs. The first two QWPs (with respect to the display side) of the compound retarders may collectively act as a half-wave (HW) retarder of light incident on the third QWP of the compound retarders. In some embodiments, such an arrangement may ensure a match between the center wavelength of the HW retarder and the QWP retarder. In some embodiments, a pancake lens configuration whereby the first two QWPs together act as a HW retarder to the third QWP in each compound retarder may be referred to herein as a HW-compensated QWP. Specifically, the chromatic HW retarder may pre-disperse the state of polarization (SOP) of the incident light, and the third QWP (e.g., chromatic QWP) may subsequently transform the light having a range of wavelengths to a common circular SOP. In another embodiment, the HWs (including two QWPs) of the compound retarder may serve to pre-disperse the polarization state of the light, while the third QWP of each compound retarder may further tune the polarization.

In some embodiments, a given, single chromatic QWP may convert linearly polarized light to circularly polarized light at a pre-determined (e.g., designed) quarter wavelength. For example, such a QWP may be configured to convert predominantly green light from linear polarization to circular polarization. However, the same QWP may not be able to effectively convert predominantly red light from linear polarization to circular polarization while also converting the green light (as the pathlength-difference may be insufficient at longer wavelengths). Further, the same QWP may not be able to effectively convert predominantly blue light from linear polarization to circular polarization (as the pathlength difference may be excessive at shorter wavelengths). Accordingly, with a single QWP, the blue light may be overcompensated (e.g., over-retarded) by the QWP, while the red light may be undercompensated (e.g., under-retarded) by the QWP. In some embodiments, by using a chromatic HW retarder before the QWP in a compound retarder, the HW may have a compound optic axis orientation with respect to the third QWP such that the SOPs of blue light and red light are slightly elliptically polarized with the same orientation and opposite handedness (in terms of polarization state) to serve as input for a chromatic transformation of the third QW retarder.

In some embodiments, the SOP of green light (or a wavelength substantially intermediate between the blue and red wavelengths) may be substantially linear after the HW retarder. The three-layer configuration may transform light at two wavelengths (e.g., blue and red) to a circular SOP, versus a single QWP, which may optimally transform light of a single wavelength. In some embodiments, the optical axes of the compound retarder (e.g., the angles of the QWPs) may determine the wavelength separation between these two wavelengths, and therefore the extent of deviation from circular polarization at intermediate wavelengths between the two wavelengths. Therefore, the compound retarder may be used to convert broadband linearly polarized light (e.g., visible light including red, green, and blue light) to circular polarization, and thus serve as an achromatic compound retarder. In some embodiments, the HW (including two separate QWPs) may have double the magnitude of retardance of the third QWP in each compound retarder.

In another embodiment, mirrored surface 132 (also referred to herein as a partial reflector) may be partially reflective to reflect a portion of the received light. In some embodiments, mirrored surface 132 may be configured to transmit approximately 50% of incident light and reflect approximately 50% of incident light. In some instances this relationship may be substantially preserved over the visible spectrum.

Front optical element 104 may include a second compound retarder 140 and a reflective polarizer 142. The second compound retarder 140 may also include individual retarders such as QWPs (e.g., three QWPs). The reflective polarizer 142 may represent a polarization-sensitive, partially reflective mirror configured to reflect received light of a first linear polarization and transmit received light of a second linear polarization. For example, reflective polarizer 142 may be a wire grid polarizer configured to reflect linearly polarized light with a polarization direction in the x-direction, and pass light that is linearly polarized in the y-direction. The reflective polarizer 142 may further include a stretched multi-layer extruded polymer stack, such as a reflective polarizer product (e.g., 3M multi-layer optical film).

Although shown as surfaces of front optical element 104 and back optical element 106 respectively, first compound retarder 130 and second compound retarder 140 may be separate from front optical element 104 and back optical element 106 in some embodiments. For example, first compound retarder 130 may be located between mirrored surface 132 and electronic display 108 (e.g., as a freestanding element in air, laminated on the surface of electronic display 108, etc.) and second compound retarder 140 may also be similarly located anywhere between mirrored surface 132 and reflective polarizer 142. Further, although shown as curved, the individual optical elements that together compose front optical element 104 and back optical element 106 in FIG. 1 may be flat or be a mix of flat and curved elements when separately provided. For example, as separate elements, first compound retarder 130 and second compound retarder 140 could be provided flat while mirrored surface 132 and reflective polarizer 142 are curved, among other variations. In one embodiment, first compound retarder 130 and second compound retarder 140 may have a cylindrical shape.

In some embodiments, the pancake lens block 102 may serve to mitigate optical aberration in an optical system. Field curvature may refer to an optical aberration that causes a flat object to appear sharp only in certain parts of the frame, instead of being uniformly sharp across the frame. More generally, field curvature may result from a focal distance of an optical system not perfectly aligning with all of the points on a focal plane. Pupil swim may refer to an effect caused by changes in the location of a user's eye within an eyebox that result in distortions in the content being presented to the user. Correcting for field curvature may mitigate pupil swim. In some embodiments, the pancake lens may mitigate field curvature in an image that is output to a user's eyes to reduce pupil swim. Additionally, pancake lens block 102 may have a small form factor, may be relatively low weight compared to other optical systems designed to remove field curvature, and/or may be configured to have a wide field of view. The operation of pancake lens block 102 is discussed below with respect to FIG. 2.

Figure 2:
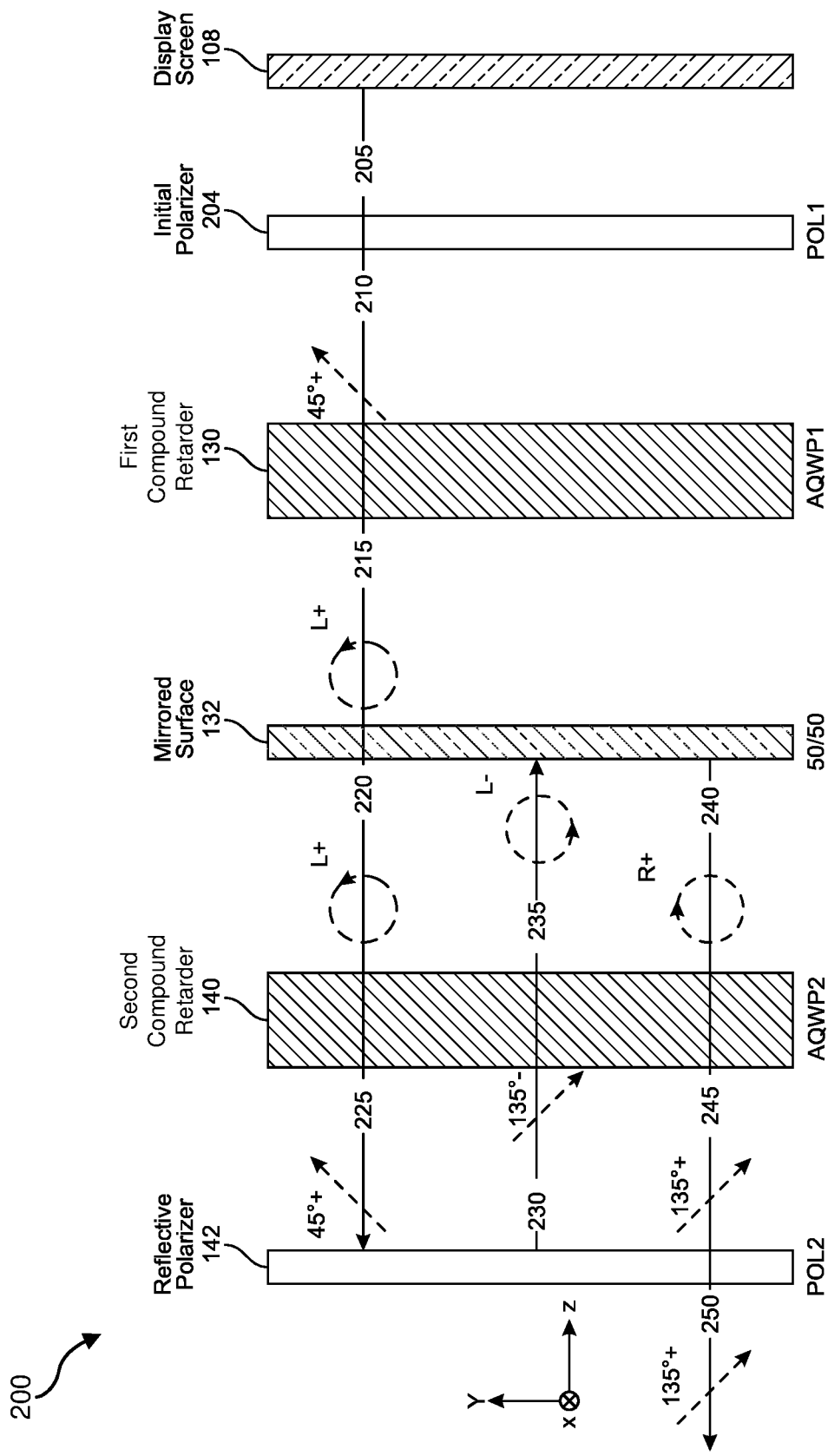
FIG. 2 shows a folded optical path with example polarization states of a pancake lens block, in accordance with one embodiment.

FIG. 2 shows a folded optical path of pancake lens block 102 in accordance with one embodiment. Light 205 from electronic display screen 108 may be initially polarized via initial polarizer 204 (POL1) to linearly polarized light 210. In some embodiments, the light emitted by the display may be already linearly polarized, in which case POL1 may not be needed. First compound retarder 130 may include an achromatic QWP (AQWP1) (e.g., including three QWPs, where the first two QWPs together serve as a HW to the third QWP, as described above) with a compound optical axis that is approximately 45 degrees relative to the direction of polarization of polarized light 210. The orientation of a compound retarder's optical axis relative to incident linearly polarized light may control the handedness and polarization ellipticity of the transmitted circularly polarized light. AQWP1 may change the polarization of light 210 from linear polarization to circular polarization for a given center wavelength and a given angle (e.g., normal incidence), which is shown as light 215. The polarization of light 215 may be clockwise or anti-clockwise based on the orientation of the axis of AQWP1 relative to incident linearly polarized light 210.

A first portion of light 215 may be reflected by mirrored surface 132 (also referred to as a partial reflector herein), and a second portion of light 215 may be transmitted by mirrored surface 132 as light 220 towards second compound retarder 140. In some embodiments, mirrored surface 132 may be configured to reflect approximately 50% of incident light (e.g., the light 215). Second compound retarder 140 may include an achromatic QWP (AQWP2) (e.g., also including three QWPs, where the first two QWPs together serve as a HW to the third QWP, as described above) and may change the polarization of light 220 from circular to linear (with light passing through AQWP2 referred to as light 225). In this arrangement, light first encounters a QW, then the HW per the "reverse order" architecture to restore the SOP. Light 225 may be incident on reflective polarizer 142 (POL2), which reflects light that is polarized in a blocking/reflecting direction (e.g., an x direction) and transmits light that is polarized in a perpendicular direction (e.g., a y direction). At this point, light 225 may be linearly polarized in the blocking direction. Thus, POL2 may reflect incident light 225 and the reflected light may be referred to as light 230. Accordingly, light 230 is again incident on AQWP2, which changes the linearly polarized light 230 to circularly polarized light 235. Further, mirrored surface 132 may reflect a portion of the polarized light 235, as described above. The reflected portion of light 235 may be referred to as light 240.

Light 240 may also be circularly polarized; however, the handedness of light 240 may be opposite to the handedness of light 235 and light 220 due to the reflection from mirrored surface 132. Thus, AQWP2 may change the polarization of circularly polarized light 240 to linearly polarized light 245. However, as the handedness of light 240 may be opposite to that of light 220, the polarization of light 245 exiting AQWP2 may be perpendicular to that of light 225. Accordingly, light 245 may be linearly polarized in a direction (e.g., y) perpendicular to the blocking direction (e.g., x) of POL2 and may therefore be transmitted by POL2 as light 250.

The process described above, however, may undergo various transformations resulting from imperfections in one or more optical elements. There may, for example, be other light paths in pancake lens block 102 due to imperfections in pancake lens block 102, and these imperfections may cause light leakage, ghost images, and the like. In particular, the wavelength of light may vary (e.g., over the visible spectrum), and a retardance of single QWPs may be a function of wavelength (and may vary with wavelength). Accordingly, a conventional (non-achromatic) QWP (e.g., not the compound retarders disclosed herein) may not be able to provide a quarter-wave retardance over the range of wavelengths of light falling incident thereon.

For example, if AQWP1 were not achromatic (e.g., referred to as QWP1), and were to produce elliptically polarized light instead of circularly polarized light, QWP2 (a non-achromatic version of AQWP2) would transmit elliptically polarized light instead of linearly polarized light. Accordingly, if the SOP of the elliptically polarized light is not restored to the input linear state, at least some light 225 may leak through POL2 in the first see-through path (and lead to artifacts called see-through ghosts) rather than reflect from POL2, as described above. Any leakage of light may be a problem, for example, when using a broadband light source, such as a color display with common chromatic QWPs (e.g., a quarter-wave plate providing quarter-wave retardance for light propagating in a specific direction at a specific wavelength). When light with a wavelength outside of the designed wavelength (and/or outside of the designed incident angle) propagates through a chromatic QWP, the polarization of the output light may be altered from the designed polarization state(s) shown in FIG. 2. Accordingly, the restoration of the input polarization of linear light may be accomplished with any combination of retarder stacks that restores the input SOP (i.e., ROC), so in such an architecture, there may not be a polarization requirement at the mid-point of the optical system.

FIG. 3A shows a pancake lens block with polarizing elements that have no orientation specification between the display polarizing components and the pancake lens block polarizing components, in accordance with one embodiment. In particular, FIG. 3A shows a pancake lens block 300 where no specific requirement has been imposed on the relative orientation between the optical element combination including a QWP2 (including a single QWP, which is not achromatic, and part of the second compound retarder 140) and a POL2 (part of reflective polarizer 142), and the optical element combination including a QWP1 (including a single QWP, which is not achromatic, and part of first compound retarder 130) and a POL1 (part of initial polarizer 204). Accordingly, POL1 and QWP1 together effectively operate as a left circular polarizer (LCP1) 315 passing left circularly polarized light. Further, QWP2 and POL2 together effectively operate as a right circular polarizer (RCP2) 317 passing right circularly polarized light in transmission and as a left circular polarizer (LCP2) 319 passing left circularly polarized light in reflection. Accordingly, the polarized light between QWP1 and QWP2 may be circularly polarized. The configuration 300 shown in FIG. 3A may work for any value of Q2, as long as P1 is ±45 degrees relative to Q1 and P2 is ±45 degrees relative to Q2, where P1, P2, Q1, and Q2 denote the optical axis values of POL1, POL2, QWP1, and QWP2, respectively. Here, QWP1 may produce circularly polarized light for a specific wavelength at a specific incidence angle.

Figure 3B:
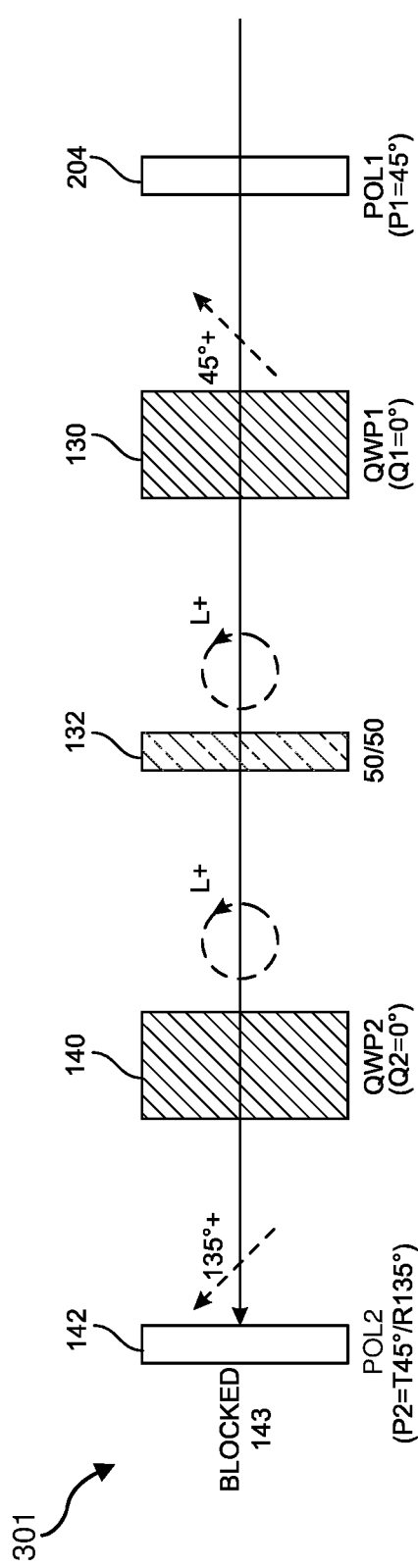
FIG. 3B shows an exemplary pancake lens block configuration (aligned to produce polarization leakage with wavelength and ray angle) that blocks light during a first see-through path at the designed wavelength (so both compound retarders do not serve as quarter-waveplates), in accordance with one embodiment.

FIG. 3B shows an exemplary pancake lens block configuration 301 (aligned to produce the most polarization leakage with wavelength and ray angle) that blocks light during a first see-through path at the designed wavelength (so both compound retarders act as quarter-waveplates), in accordance with one embodiment. As noted, QWP1 may produce circularly polarized light for a specific wavelength at a specific incidence angle. In general, as shown FIG. 3B, this circularly polarized light may be blocked 143 by QWP2 and POL2 optical element combination, regardless of the orientation of Q2, as long as Q2 is orientated 45 degrees relative to P2.

Figure 3C:
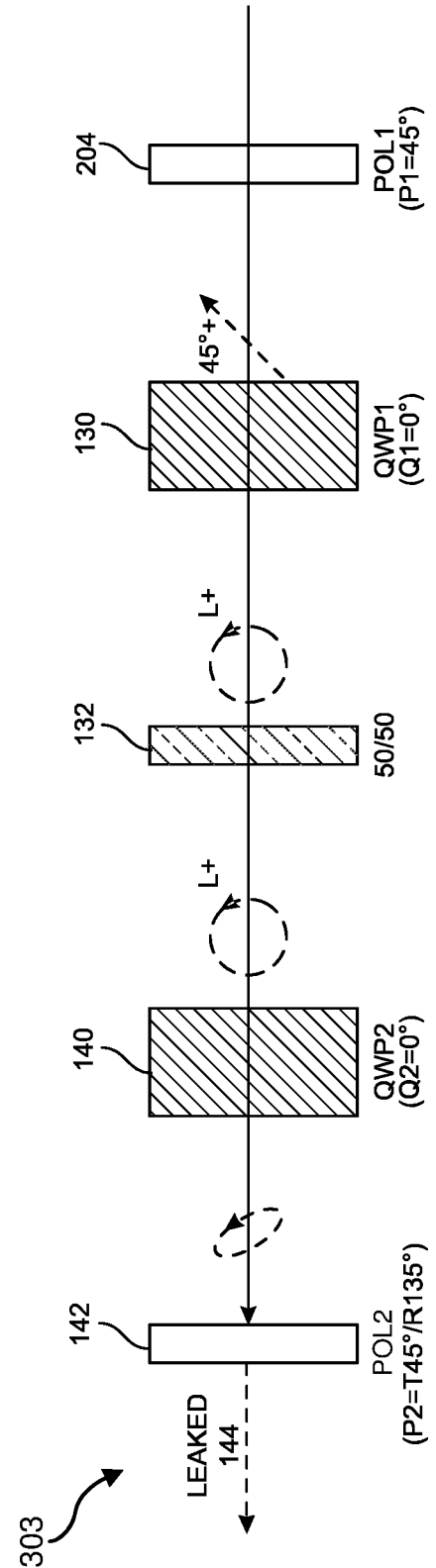
FIG. 3C shows an exemplary pancake lens block configuration (aligned to produce the polarization leakage with wavelength and ray angle) that leaks light during a first see-through path for other wavelength (so both compound retarders do not serve as quarter-waveplates), in accordance with one embodiment.

FIG. 3C shows an exemplary pancake lens block configuration 303 (aligned to produce the most polarization leakage with wavelength and ray angle) that leaks light during a first see-through path for light of non-designated wavelengths (so both compound retarders do not act as quarter-waveplates), in accordance with one embodiment. Accordingly, as illustrated in FIG. 3C, since the QWP1 and QWP2 do not provide a quarter-wave retardance for other wavelengths and/or other incidence angles, light with a different wavelength and/or a different incidence angle may leak through 144. For example, as shown in FIG. 3C, QWP2 may transmit elliptically polarized light instead of linearly polarized light, a portion of which may be leaked by reflective polarizer 142.

Accordingly, one way to reduce leakage is by fixing the relative orientation between the compound optical axis values Q1 and Q2. Rather than aligning QWP1 with QWP2, which effectively results in a half-wave plate that rotates 45 degrees linearly polarized incident light to 135 degrees linearly polarized light, as shown in FIG. 3A, QWP2 may have an optical axis that is oriented orthogonal to QWP1, as shown in FIG. 4.

Figure 4:
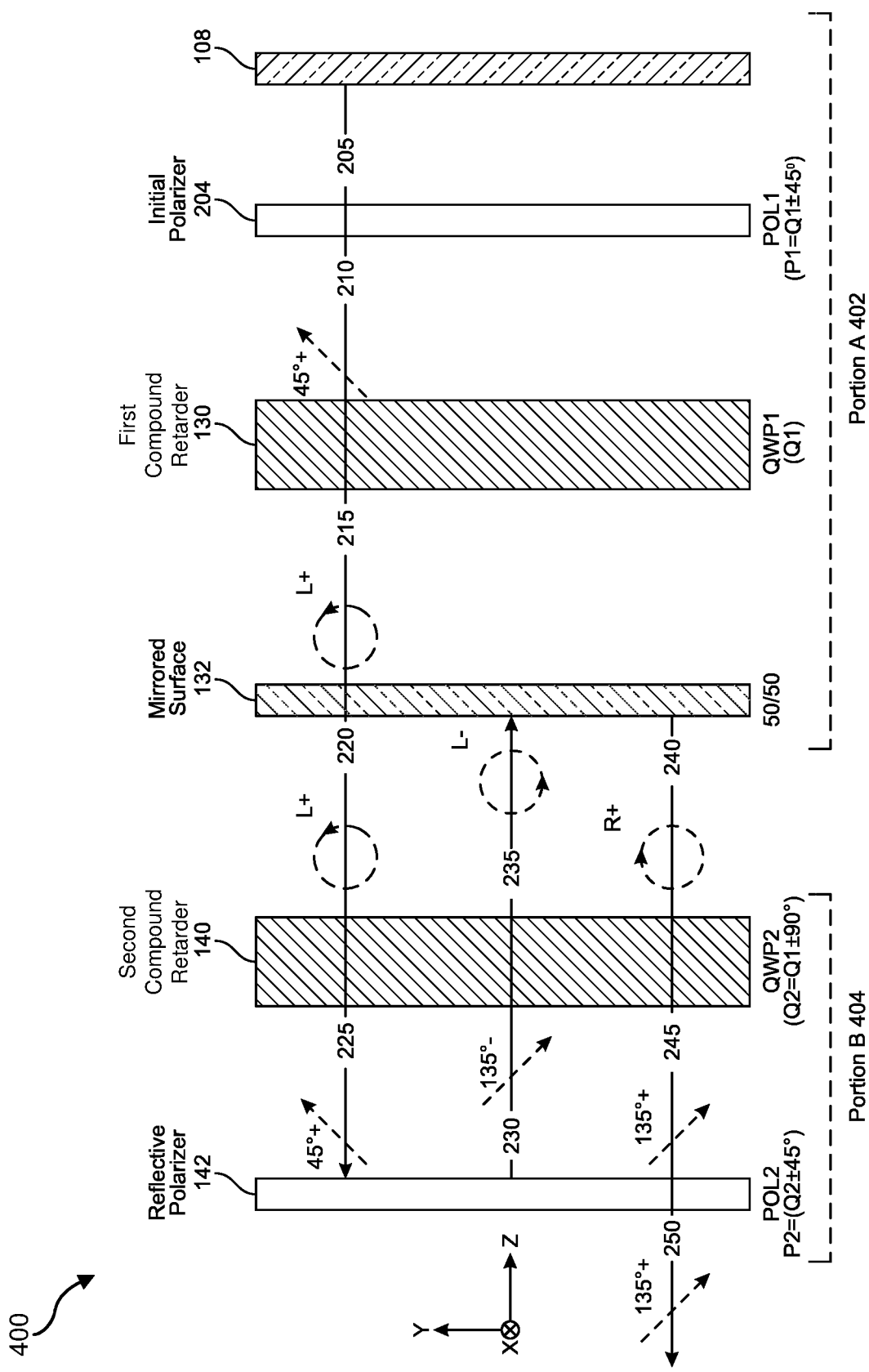
FIG. 4 shows an exemplary pancake lens block with polarizing elements that have an orthogonal orientation relative to each other, in accordance with one embodiment.

FIG. 4 shows an exemplary pancake lens block with polarizing elements that have an orthogonal orientation relative to each other, in accordance with one embodiment. In particular, diagram 400 shows a portion A 402 of the pancake lens block including POL1, QWP1, and mirrored surface 132 (which may be a partial reflector). Further, diagram 400 shows a portion B 404 of the pancake lens block including QWP2 and POL2. In this configuration, QWP2 of portion B 404 may undo the retardance induced by QWP1 of portion A 402 and, thereby, return the 45 degrees linearly polarized incident light on QWP1 back to 45 degrees linearly polarized light for a broadband spectrum of wavelengths. This fixed linearly polarized light at 45 degrees may then be reflected by POL2, and the light leakage may be substantially reduced for a broad spectrum of wavelengths. More precisely, LCP1 315 and RCP2 317 (shown and described in connection with FIG. 3A, above) may be "crossed" (e.g., have optical axes values that are different by 90 degrees, that is orthogonal to one another) in transmission for a broad range of wavelengths (e.g., wavelengths spanning the visible range).

A further explanation for the crossed configuration of the LCP1 315 and RCP2 317 (shown and described in connection with FIG. 3A, above) may be described with reference to FIG. 5 and FIG. 6. In particular, a given compound retarder (i.e., QWP1 or QWP, shown and described in connection with FIG. 3A) may be represented by a vector including two optical properties: a retardance magnitude (e.g., a quarter-wavelength, in this example) and an optical axis orientation (e.g., angle).

Figure 5:
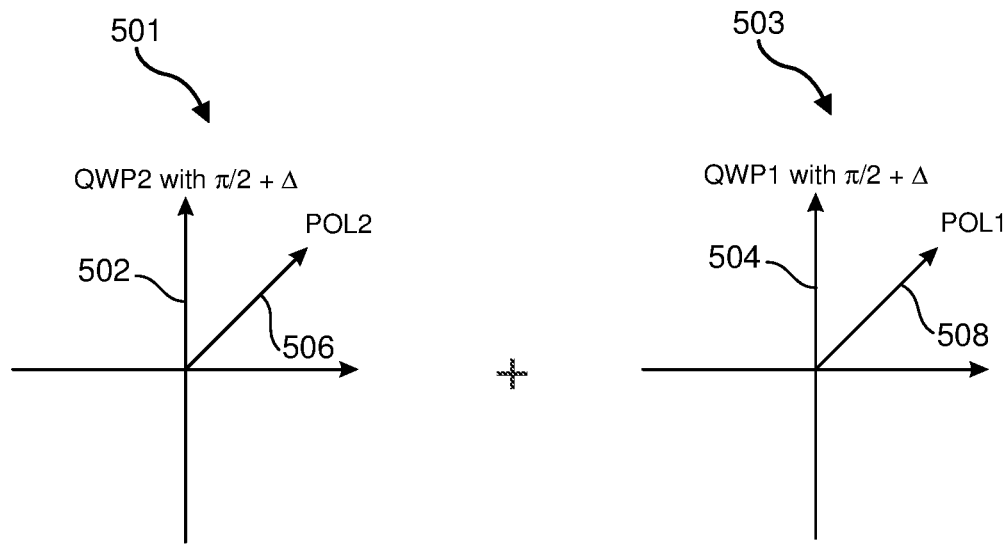
FIG. 5 shows the polarization orientation of an exemplary pancake lens block with polarizing elements that have an orientation specification that produces the most polarization leakage with wavelength and ray angle, in accordance with one embodiment.

FIG. 5 shows the polarization orientation of a pancake lens block with polarizing elements that have an orientation specification that produces the most polarization leakage with wavelength and ray angle, in accordance with one embodiment. As shown in FIG. 5, if the optical axis 502 of QWP2 as represented by diagram 501 is parallel to the optical axis 504 of QWP1 as represented by diagram 503, the retardance of the QWPs may be effectively additive (e.g., the polarization vector 506 for QWP2 and the polarization vector 508 for QWP1 are additive), and a spectral dispersion effect on light propagating through the QWPs increases. The light leakage of such imperfect QWPs in pancake lens block 102 may thus be proportional to $\cos^2(\pi/2+\Delta)$, where $\pi/2$ is included to capture the retardance magnitude of the quarter-wave and $\Delta$ is a retardance error of QWP1 and QWP2. For example, a 15 degrees retardance error for $\Delta$ may result in a light leakage of approximately 6.7% through the pancake lens block 102 (see FIG. 1), for example, which may degrade image contrast and lead to the formation of ghost images in optical systems using the pancake lens block.

Figure 6:
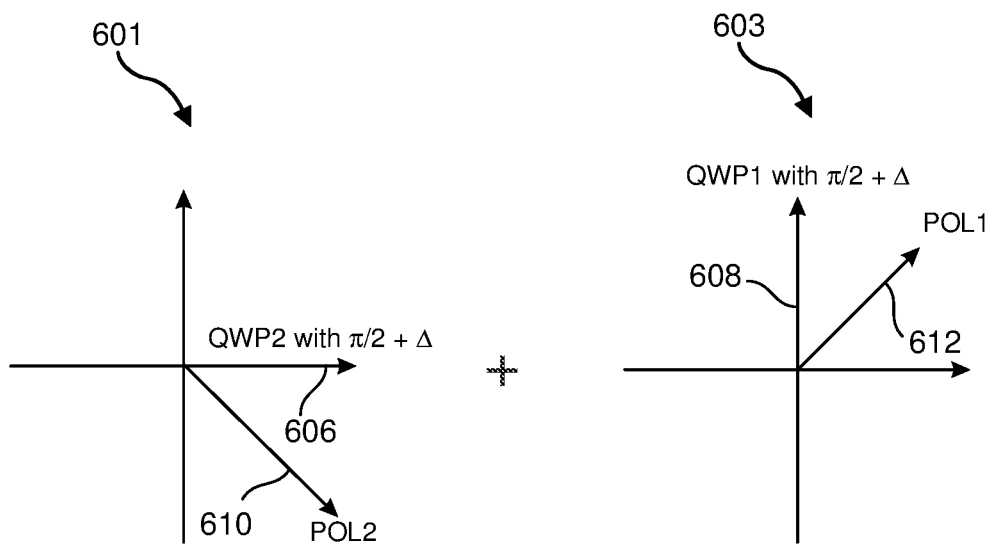
FIG. 6 shows the polarization orientation of an exemplary pancake lens block with polarizing elements that have an orthogonal orientation relative to each other that produces the least polarization leakage with wavelength and ray angle, in accordance with one embodiment.

FIG. 6 shows the polarization orientation of a pancake lens block with polarizing elements that have an orthogonal orientation relative to each other that produces the least polarization leakage with wavelength and ray angle, in accordance with one embodiment. Referring to FIG. 6, if the optical axis 606 for QWP2 as represented by diagram 601 is set orthogonal to the optical axis 608 of QWP1 as represented by diagram 603, the vectors representing the magnitudes of the retardance and the optical axes of the compound retarders may subtract (e.g., the polarization vector 610 for QWP2 and the polarization vector 612 for QWP1 are subtractive), and a spectral dispersion effect on light propagating through the QWPs may decrease. The subtraction of the vectors may effectively cancel the retardance error A of both QWP1 and QWP2. Thus, the optical aberrations of the combined QWPs in this arrangement may effectively be zeroed out. Accordingly, the transmitted linearly polarized light from QWP2 (e.g., light 250 shown in connection with FIG. 3A and described in connection with FIG. 2) may be the same as the linearly polarized light incident on QWP1 (e.g., light 210 shown in connection with FIG. 3A and described in connection with FIG. 2). Moreover, since the transmission axis of POL2 is orthogonal to POL1, the transmitted linearly polarized light from QWP2 may not transmit through POL2.

Figure 7A:
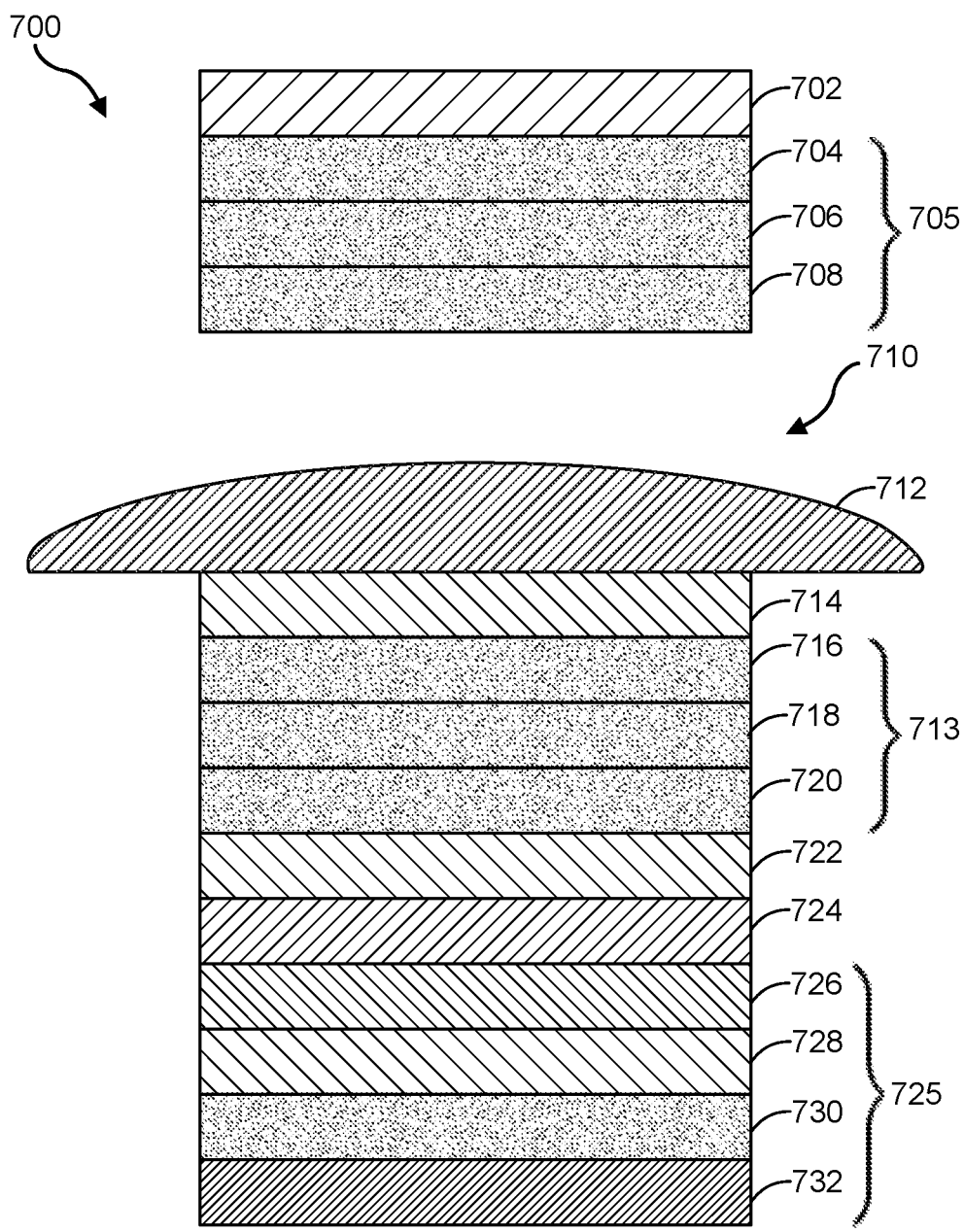
FIG. 7A shows a diagram of an example optical layout of a reverse-order crossed pancake lens block, in accordance with one embodiment.

FIG. 7A shows a diagram 700 of an ROC-based pancake lens block in accordance with example embodiments of the disclosure. In particular, diagram 700 includes a polarizer 702 (e.g., a pre-polarizer or analyzer from a display, not shown) that generates linearly polarized light. A first compound retarder 705 may be coupled to the polarizer 702. In one embodiment, the first compound retarder 705 may include three QWPs (e.g., a first QWP 704, a second QWP 706, and a third QWP 708). In some embodiments, the first compound retarder 705 may serve to generate circularly polarized light from the linearly polarized light generated by the polarizer 702 as variously described herein.

In at least one embodiment, a partial reflector 712 (e.g., a 50:50 beamsplitter) may be provided across a distance 710 or cavity (which may be filled with air or another material, such as a nanovoided material having a predetermined index of refraction). In another embodiment, the partial reflector 712 may include a surface that may be convex, concave, or irregular. A second compound retarder 713 may be coupled to the partial reflector 712, for example, using an index matching material 714. The index matching material may include a substance, such as a liquid, cement (adhesive), or gel, which has an index of refraction that closely approximates that of second compound retarder 713 and the partial reflector 712. By using an index-matching material between the second compound retarder 713 and the partial reflector 712, radiation may pass from the second compound retarder 713 to the partial reflector 712 without significant reflection or refraction. In some examples, polymers dissolved in volatile organic compounds (VOCs), such as nitrocellulose, and acrylic compounds dissolved in lacquer thinner and/or a mixture of several solvents (typically containing butyl acetate and xylene or toluene) may be used as an index-matching material.

In various embodiments, the second compound retarder 713 may include three QWPs (e.g., a first QWP 716, a second QWP 718, and a third QWP 720). In another embodiment, the second compound retarder 713 may be in an ROC configuration with respect to the first compound retarder 705. Further, the second compound retarder 713 may be coupled to a reflective polarizer 724, for example, using an index matching material 722. In one aspect, diagram 700 further shows an optional eye-reflection portion 725 that serves to reduce back reflections emanating from a user's eye. In particular, the eye-reflection portion 725 may include a polarizer 726, a third compound retarder 730, and an anti-reflective material 732 (e.g., a shaped antireflective lens). Further, the polarizer 726 may be coupled to the third compound retarder 730 using an index matching material 728. In some aspects, diffuse scatter from the viewer may be depolarized, such that the portion of the field projected onto the reflection axis of the reflective polarizer is efficiently returned to the viewer. Polarizer 726 may have an absorption axis along this direction, so this component is substantially blocked. Moreover, any specular reflections from the viewer (e.g. the cornea) may be returned to polarizer 726 with substantially no change in the state of polarization. The addition of retarder 730 may produce a ghost-buster, such that specular reflections are returned to polarizer 726 with substantially the orthogonal state-of-polarization, which may be absorbed.

As noted, the distance 710 included in the pancake lens block of diagram 700 defining a cavity or gap may include air or any other suitable material including a nanovoided material (e.g., a material having a plurality of voids and/or nano-sized voids in the material having a predetermined density of nanovoids that include an associated refractive index that may be tuned. In some embodiments, the nanovoids may occupy at least approximately 10% (e.g., approximately 10% by volume, approximately 20% by volume, approximately 30% by volume, approximately 40% by volume, approximately 50% by volume, approximately 60% by volume, approximately 70% by volume, approximately 80% by volume, approximately 90% by volume) of the volume of the nanovoided material. The voids and/or nanovoids may be either closed- or open-celled, or a mixture thereof. If they are open-celled, the void size may be the minimum average diameter of the cell. In some embodiments, the nanovoided material may include a thermoset material and/or any other suitable material.

The voids and/or nanovoids may be any suitable size and, in some embodiments, the voids may approach the scale of the thickness of the nanovoided material. For example, the voids may be between approximately 10 nm to about equal to the thickness of the nanovoided material. In some embodiments, the voids may be between approximately 10 nm and approximately 1000 nm, such as between approximately 10 and approximately 200 nm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 110 nm, approximately 120 nm, approximately 130 nm, approximately 140 nm, approximately 150 nm, approximately 160 nm, approximately 170 nm, approximately 180 nm, approximately 190 nm, approximately 200 nm, approximately 250 nm, approximately 300 nm, approximately 400 nm, approximately 500 nm, approximately 600 nm, approximately 700 nm, approximately 800 nm, approximately 900 nm, approximately 1000 nm).

In some embodiments, the nanovoided material may be formed from curable materials (to be described below), and a first side of the nanovoided material may be deposited onto a removable substrate material. Moreover, a second, exposed side of the nanovoided material may be laminated onto a surface of a given optical element in the ROC pancake lens (e.g., a surface of the second compound retarder 713 or a surface of the reflective polarizer 724), and the removable substrate material may be removed from the first side of the nanovoided material.

Further, in terms of fabrication of the nanovoided material, a curable material (e.g., a monomer) may be deposited (e.g., vaporized by a vaporizer as part of a deposition system, for example, a thermal evaporation system) onto a removable substrate material. In some embodiments, a corresponding monomer initiator may be used for starting a chemical reaction to form the nanovoided material. In some examples, "monomer," as used herein, may refer to a monomer that forms the nanovoided material.

Moreover, the deposited curable material may be cured with a source of radiation (e.g., actinic energy) to form the polymer material. In some embodiments, the source of radiation may, for example, include an energized array of filaments that may generate actinic energy to initiate reaction between the monomer and the monomer initiator to effect polymerization of the monomer. The monomer and monomer initiator may react upon exposure to radiation from a radiation source to form a polymer element. In some examples, "actinic energy," as used herein, may refer to energy capable of breaking covalent bonds in a material. Examples may include electrons, electron beams, x-rays, gamma rays, ultraviolet and visible light at appropriately high energy levels, and ions.

Figure 7B:
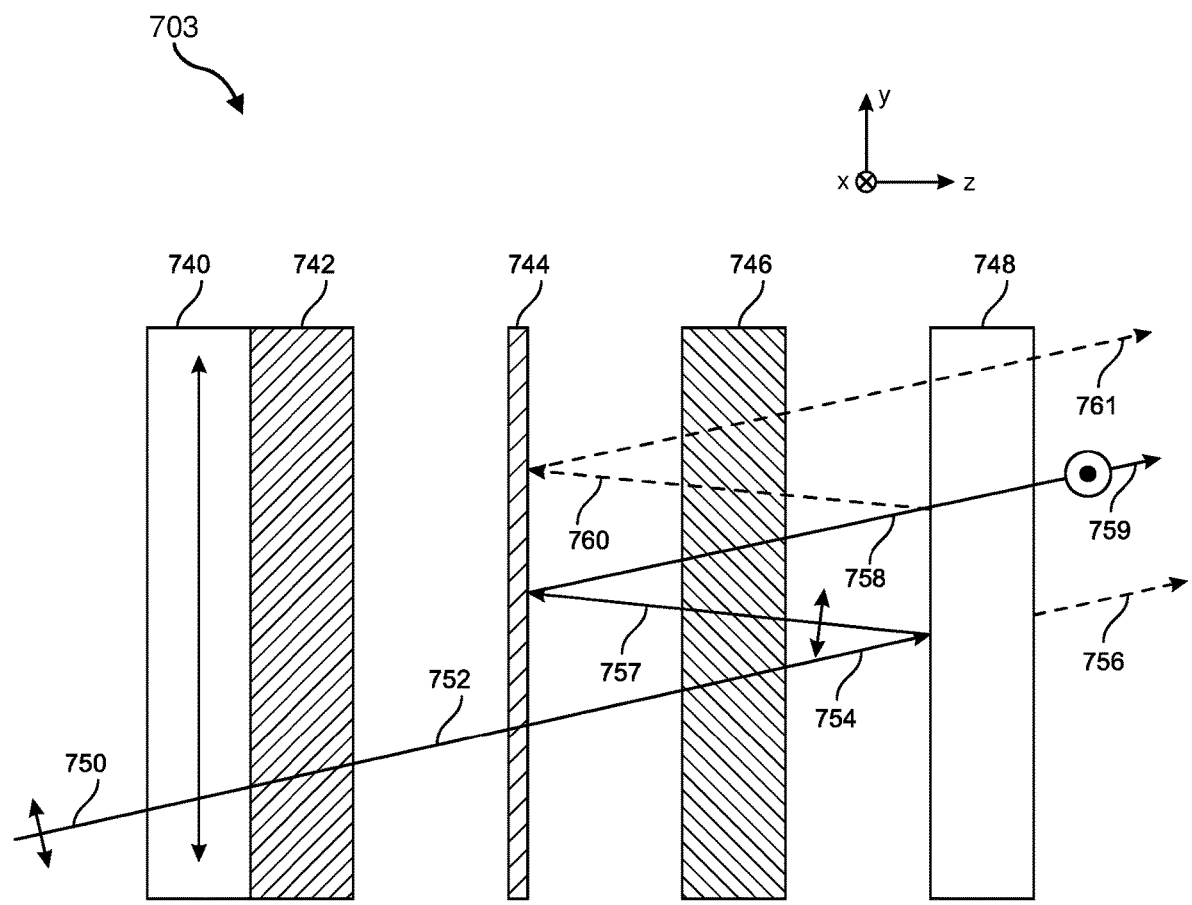
FIG. 7B shows another diagram of an example optical layout of a reverse-order crossed pancake lens block including example visual artifacts, in accordance with one embodiment.

FIG. 7B shows another view of the reverse order crossed pancake lens block and associated artifacts, in accordance with example embodiments of the disclosure. In another embodiment, diagram 703 shows a polarizer 740, a first compound retarder 742, a partial reflector 744, a second compound retarder 746, and a reflective polarizer 748, which were described above. In particular, diagram 703 shows a folded optical path of pancake lens block and the various optical artifacts associated with the pancake lens block. Light 750 (e.g., light emanating from an electronic display, not shown) may initially be polarized via polarizer 740 to linearly polarized light. In some embodiments, the light emitted by the display may be already linearly polarized, in which case the polarizer 740 may not be needed. First compound retarder 742 may be achromatic and may have a compound optical axis that is approximately 45 degrees relative to the direction of polarization of light from the polarizer 740. The orientation of the compound optical axis of first compound retarder 742 relative to incident linearly polarized light may control the handedness and polarization ellipticity of the transmitted circularly polarized light 752. The compound retarder 742 may change the polarization of light 750 from linear polarization to circular polarization for a given center wavelength and a given angle (e.g., normal incidence) or range of angles, to generate light 752. The polarization of light 752 may be clockwise or anti-clockwise based on the orientation of the axis of the first compound retarder 742 relative to incident linearly polarized light from the polarizer 740.

A portion of light 752 may be transmitted by partial reflector 744 towards second compound retarder 746. The second compound retarder 746 may be achromatic and may change the polarization of light 752 from circular to linear (referred to as light 754). Light 754 may be incident on reflective polarizer 748, which may reflect light 757 that is polarized in a blocking/reflecting direction (e.g., an x direction) and transmit light 756 that is polarized in a perpendicular direction (e.g., a y direction). This transmitted light 756 may be referred to as a see-through ghost herein and may have an intensity that may be proportional to $\cos^2(\epsilon)$, where E refers to the projection of the incident state of polarization of light 754 onto the reflection axis of the reflective polarizer 748, in terms of power. This term captures both orientation errors and ellipticity errors resulting from improper restoration of the initial linear state. The error can result from improper matching of the two QW retarders in fabrication (e.g. even at normal incidence), distortions that can happen to the state of polarization off-normal, or some combination of the two. At this point, light 754 may be linearly polarized in the blocking/reflecting direction. Thus, the reflective polarizer 748 may reflect light 754 and the reflected light may again be incident on the second compound retarder 746, which may change the linearly polarized light to circularly polarized light 757. Further, the partial reflector 744 may reflect a portion of the polarized light 757 back through the second compound retarder 746 and the reflective polarizer 748 to yield transmitted signal image light 759, which may have an amplitude proportional to $\cos^2(\epsilon) \cos^2(\delta)$, where $\delta$ may refer to the projection of the state-of-polarization of light 758 onto the axis orthogonal to the reflection axis of reflective polarizer 748 (i.e. the "transmission axis") after a round-trip of compound retarder 746. This error may be associated with incomplete conversion of light 754 to the orthogonal linear state-of-polarization 758 due to non-ideal polarization transformation by compound retarder 746.

At this point, the reflective polarizer may again reflect a portion of light 758 proportional to $\sin^2(\delta)$ and the reflected light may again propagate through the second compound retarder 746, and the partial reflector 744 may reflect a portion of the polarized light 760 back through the second compound retarder 746 and the reflective polarizer 748 to yield transmitted light 761, which may be referred to as a double-bounce ghost light herein and may be an undesirable visual artifact in the pancake lens and which may be suppressed using the techniques described herein.

In some embodiments, the QWPs used in connection with the compound retarders (e.g., the first, second, and/or third QWPs such as the first QWP 704, second QWP 706, and third QWP 708 of compound retarder 705 shown and described in connection with FIG. 7A, above) may include dispersion-controlled quarter-wave retarding films. In some embodiments, quarter-wave retarding films may include a co-polymer resin with a positive and negative dispersion and/or a predetermined path length-difference versus wavelength. In some embodiments, a co-polymer of polycarbonate and polystyrene may be used as the material for the compound retarders (e.g., the first, second, and/or third QWPs). In some embodiments, such a copolymer of polycarbonate and polystyrene may be configured to have a composite retardation that is approximately equal to a quarter-wave over a range of visible wavelengths (e.g., between approximately 390 nm and approximately 700 nm).

Although the embodiments described may include two compound retarders (e.g., first compound retarder 705 and second compound retarder 713 shown and described in connection with FIG. 7A) in an ROC configuration where each compound retarder includes multiple (e.g., an odd number of) QWPs, alternative embodiments may include designs having two single-element retarders (e.g., two single quarter wave retarders) configured in series and in an ROC configuration with each other.

As noted, the first compound retarder (e.g., first compound retarder 705 shown and described in connection with FIG. 7A) may include a first QWP (e.g., first QWP 704) and a second QWP (e.g., second QWP 706) together serving as a half-wave (HW) plate, and may include a third QWP (e.g., third QWP 708) oriented at an angle with respect to the HW plate. Additionally or alternatively, the second compound retarder (e.g., second compound retarder 713 shown and described in connection with FIG. 7A) may similarly include a first QWP, then a second QWP and a third QWP together serving as a HW oriented at an angle with respect to the first QWP plate.

Figure 7C:
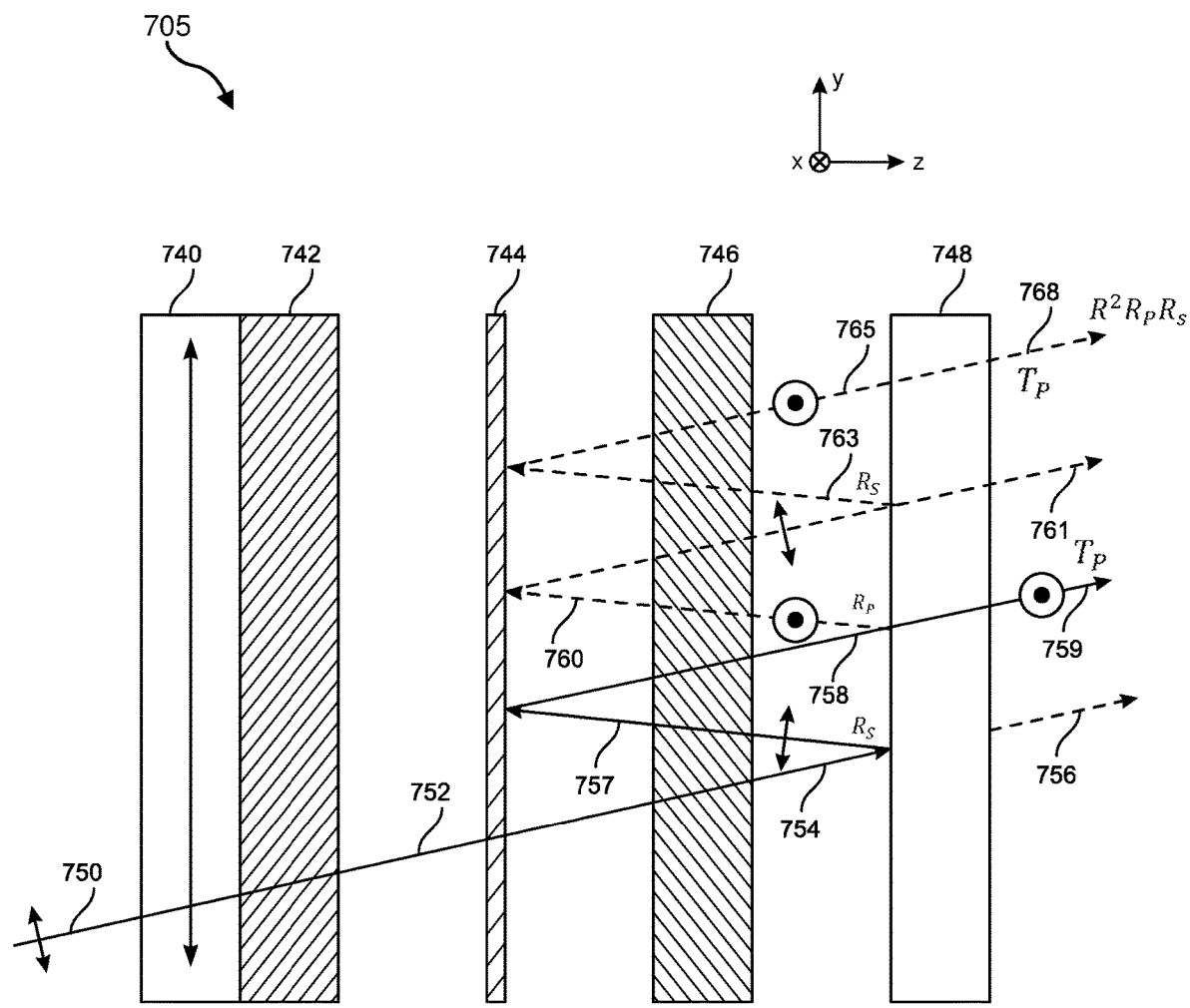
FIG. 7C shows another diagram of an example optical layout of a reverse-order crossed pancake lens block including another example visual artifact, in accordance with one embodiment.

FIG. 7C shows yet another diagram of an example optical layout of a reverse-order crossed pancake lens block including example visual artifacts, in accordance with one embodiment. In some aspects, while FIG. 7B showed an example second visual artifact (e.g., the double bounce ghost 761) a further artifact in the ROC pancake lens structure 705 may include a third visual artifact that can arise from the interaction of the light 750 with the reflective polarizer 748. Such a visual artifact may be referred to as a triple-bounce ghost (TPG) 768, to be discussed further below. In some aspects, the diagram 705 shows both light having both s and p polarizations. Further, the orientations for the s and p polarized light shown in diagram 705 may be different than some optics conventions (e.g., the s polarized light may typically be oriented parallel to an interface in conventional diagrams). This change of conventional notation will not affect the description of the visual artifacts and the disclosed embodiments for reducing their impact and magnitude on the ROC pancake lens and associated optical systems.

As shown in FIG. 7C, following the signal-path of light 750, light that has completed one round-trip of the cavity (e.g., light 758) may be efficiently transmitted by the reflective polarizer (e.g., light 759), with transmission proportional to $T_p$ (i.e. the transmission of p-polarized light). However, as noted, an imperfect reflective polarizer (e.g., the reflective polarizer 748) may reflect a portion of this light (e.g., light 760) back into the cavity defined by the partial reflector 744 and the second compound retarder 746, the reflective polarizer reflecting the light with reflectivity $R_p$. In some aspects, the reflected light (e.g., light 760) may be substantially converted back to s-polarization after a double-pass through the second compound retarder 746, and reflection from the partial reflector 744 (with reflectivity that may be approximately 50%). This light (e.g. light 763) may be returned to the cavity with an additional amplitude factor $R_s$. Moreover, such light may be substantially converted back to p-polarization (e.g., light 765) after a double-pass of the second compound retarder 746 and reflection from the partial reflector 744. Gathering the amplitude terms associated with reflection of the light through the pancake lens bloc, a visual artifact which may be referred to as a triple-bounce ghost 768 (associated with an imperfect reflective polarizer 748) may be transmitted with contrast (relative to the signal path) that may be proportional to $4/(R_p R_s \cos^4 \delta)$, where the term $\delta$ may refer to an error in the round-trip polarization conversion as previously described.

In some aspects, an ideal reflective polarizer may have associated values of $T_p=1$, $R_s=1$, and so, for such an ideal reflective polarizer, $R_p=T_s=0$. Such an $R_p$ term and associated visual artifacts (e.g., the triple bounce ghost) may be reduced relative to the signal by either decreasing $R_p$ or decreasing the reflectivity of the reflective polarizer 748. Other mechanisms for reducing this ghost (e.g. reduced polarization conversion efficiency) tend to increase the amplitude of other ghosts. In another aspect, the triple bounce ghost 768 may be reduced by reducing the reflection of the p-polarized light (e.g., light 760). In some aspects, the reflective polarizer 748 may be configured to include an antireflective coating and/or an index matched layer to the reflective polarizer 748 on the surface of the reflective polarizer 748. In some aspects, such an AR coating may include an oxide, a polymer, or any other type of suitable material. Further, the AR coating may include a multi-layer coating. In another aspect, the AR coating may include one or more particles having a refractive index designed to tune the refractive index of the AR coating. In another aspect, the AR coating may be disposed on the reflective polarizer 748 using any suitable method including, but not limited to, atomic layer deposition (ALD), physical vapor deposition (PVD), chemical vapor deposition (CVD), thermal evaporation, spin coating, or the like. In another aspect, the AR coating may have a thickness that is a quarter wavelength, a half-wavelength, a three-quarters wavelength, or any suitable multiple of the center design wavelength of the pancake lens block.

As noted, in various embodiments, the first compound retarder and the second compound retarder may be in a reverse order crossed (ROC) configuration with respect to each other. Moreover, the sequence of the first, second, and third QWPs of the first compound retarder may be the reverse of the sequence of the first, second, and third QWPs of the second compound retarder. Further, the orientation of the optical axis of the second compound retarder (e.g., the orientation of the first, second, and third QWPs of the second compound retarder) may be ninety degrees (orthogonal) with respect to the orientation of the optical axes of the first compound retarder (e.g., the orientation of the first, second, and third QWPs of the first compound retarder).

In various embodiments, environmental effects may result in spatial variation of the orientations of one or more of the QWPs of the first compound retarder. Accordingly, despite having rotated the optical axis orientation of the QWPs of the second compound retarder, both compound retarders may not be precisely reverse-order crossed in the pancake lens block, which may lead to light leakage in the see-through path of propagation through the pancake lens block. Further, the first compound retarder (e.g., first compound retarder 705, shown and described in connection with FIG. 7A) may be coupled to a display and/or electronics of a head-mounted display or other optical device, and may therefore be exposed to temperature and/or moisture conditions that are different from those of the second compound retarder. Accordingly, each compound retarder may experience differential temperature and/or humidity over time, which may disrupt the reverse-order crossed architecture and introduce polarization errors in the optical system.

In some embodiments, low stress optical coefficient materials, high modulus materials, and/or materials that resist the absorption of moisture may be used to manufacture the materials composing the compound retarders (e.g., the individual QWPs used in the compound retarders) in the ROC-based optical system. Using such low stress optical coefficient materials may lead to improvements in the environmental robustness of the ROC-based optical system, resulting in reduced mismatch in the configured orientations of the compound retarders of the pancake lens block and thereby lead to consistently high image contrast in the pancake lens block enabling a repeatable user experience. Moreover, the manufacturing process for the fabricating such optical elements may be improved by using such low stress optical coefficient materials.

In particular, as noted, the ROC-based pancake lens block based on two compound retarders in series may be able to restore the polarization state of input light propagating in a first pass through the pancake lens block, thereby reducing visual artifacts (e.g., see-through ghost images, as described in connection with FIG. 7B, above). Further, environmental variation in the retarders (e.g., QWPs) of the compound retarders may cause the first compound retarder (nearer to the display side) to be mismatched to the second compound retarder, and therefore no longer serve as an ROC matched pair. Moreover, the compound retarders may include contrast determining elements, and therefore, small mismatches (e.g., mismatches in the optical axes of the compound retarders) may be significant to the performance of the ROC pancake lens block. Further, as the number of retarders (e.g., QWPs) in the compound retarders increases, such mismatches in the optical axes of the retarders may compound and thereby negatively impact the ROC optical system's contrast. As such, a retarder material that is uniform (e.g., spatially uniform and/or uniform when unexposed to light and environmental factors) and stable against environmental factors may be advantageous for use in the individual retarders (e.g., QWPs) of the compound retarders in an ROC system, particularly in ROC systems with high component counts (e.g., high number of retarders in each compound retarder).

In some embodiments, the compound retarders may include materials that have a retardance that is uniform and may withstand humidity and temperature differentials such that the first and second compound retarders remain reverse-order crossed. As noted, the more elements the compound retarders include (e.g., three, four, or more retarders), the more the materials composing the compound retarders may need to be able to withstand humidity and temperature differentials in order to maintain ROC, as the net retardances and/or orientation discrepancy effects may compound with the inclusion of additional retarders. For example, the first compound retarder may have three QWPs each including three separate films; accordingly, each difference in either the retardance or orientation of any of the three films may be magnified when coupled to the three films of the second compound retarder (e.g., the ROC complement of the first compound retarder), and may therefore become sources of light leakage. In some embodiments, one commonly used film (e.g., based on cost and availability) for compound retarders may include a polycarbonate film. However, such polycarbonate films may have relatively high environmental sensitivity and may not be able to withstand the temperature and/or humidity differentials to maintain the ROC configuration in a pancake lens block, as described above. Further, polycarbonate may be a relatively soft material and therefore it may be difficult to implement an ROC architecture using such a material during manufacturing of the pancake lens. In particular, maintaining the ROC configuration in the pancake lens block during a lamination process and subsequent processing may be challenging, at least in part due to the sensitivity of retardation materials to in-plane stresses that they may undergo during manufacturing. In another embodiment, cyclic olefin films may be used, in part for their ability to withstand temperature and humidity differentials.

Although the embodiments described above (e.g., retarder materials having low stress optical coefficient) include two compound retarders in an ROC configuration where each compound retarder includes multiple (e.g., an odd number of) QWPs, alternative embodiments may include designs having two single-element retarders (e.g., two single QWPs) in series in an ROC configuration.

As noted, in an ROC-based pancake lens block, the ROC elements such as the first and second compound retarders (e.g., first compound retarder 705 and second compound retarder 713 shown and described in connection with FIG. 7A) configured in a ROC pancake lens block may together have no net effect on the polarization state of light at normal incidence. In some embodiments, such an ROC-based system may simplify the design process of the ROC pancake lens block by allowing the second compound retarder to be designed independently of the first compound retarder. The second compound retarder may be configured to be the ROC complement to the first compound retarder (e.g., the second compound retarder may be configured to have orthogonal optical axes to the first compound retarder and be reversed in terms of order of the individual retarders of the second compound retarder with respect to the individual retarders of the first compound retarder). In some aspects, the second compound retarder may effectively serve as a double-pass half-wave plate (e.g., an effective polarization rotator) in the pancake lens block. Accordingly, the contrast and color uniformity of the artifacts (e.g., double-pass ghosts as shown and described in connection with FIG. 7B) may need to be balanced against one another.

In one embodiment, a design that may be used to optimize the photopic contrast may include a pair of ROC-based zero-order QW retarders (e.g., single QW retarders optimized for normally incident light) instead of compound retarders. In some embodiments, the center wavelength of a given QW retarder in such a configuration may be configured such that a double pass of light propagating through the QW retarder (e.g., corresponding to a half-wave retardation) produces the highest photopic contrast. In another embodiment, such a contrast may be accomplished by evaluating the photopic contrast of the QW retarder configured between parallel polarizers for a half-wave retardation of light propagating in a double pass through the QW retarder. Moreover, the photopic contrast may be determined both at normal incidence and over a range of incidence angles and the retardation magnitude that yields the highest value of contrast may be determined. In some aspects, the above procedure may be used to obtain an optimized retardation using a QW retarder. For example, a QW retarder may be designed to operate at a center wavelength of approximately 550-565 nm and may be configured to produce a photopic contrast of approximately 70:1 using uniaxial materials (e.g. due to the leakage of light in double-pass of the QW retarder between parallel polarizers). In some embodiments, a single zero-order QW retarder design may minimize the retardation in the thickness direction of the QW retarder, and therefore the loss in contrast for light of off-normal incidence angles. Additionally, low dispersion materials (e.g., cyclo-olefin polymers, such as those manufactured by ZEON) may have near zero birefringence dispersion, which may mitigate retardation errors versus wavelength.

In some embodiments, for an ROC pancake lens block having a pair of zero-order (e.g., non-compound) retarders in an ROC configuration (e.g., first and second retarders configured to operate on light at normal incidence), the second retarder may be configured such that a single null (e.g., point of zero-transmission) may be generated in a plot of leakage versus wavelength. Further, the null may be optimized at the point of maximum photopic sensitivity of the human eye (e.g., approximately 550 nm, as described by the photopic response curve of the human eye).

As noted, a pancake lens block featuring compound retarders may include a configuration whereby, in each compound retarder, the first two individual retarders (e.g., the first two individual QWPs) serve as a HW polarizer to the third retarder (e.g., third QWP). Such a configuration may be referred to herein as a HW-compensated retarder (e.g., a HW compensated QWP). In another embodiment, the HWs of each compound retarder may serve to pre-disperse the polarization state of the light, while the QWP of each compound retarder may transform from a quasi-linear state-of-polarization (SOP) from the HW, to a relatively achromatic-circular SOP.

In some embodiments, the HW (e.g., the first two retarders in the compound retarder) may affect light in a broad spectrum of wavelengths, changing such light from the light's original linear polarization to a second quasi-linear polarization, such that when the third retarder (e.g., the third QWP in the compound retarder) acts on the light of the second linear polarization, the light is circularly polarized for a relatively broad spectrum of wavelengths.

In some embodiments, at least one function of an optical system (e.g., a HMD) including the pancake lens block may be to reduce the transmission of leakage light in the optical system. In particular, artifacts such as see-through ghosts may be a function of light that is transmitted from a display (e.g., a light-emitting diode display of an HMD) to the eye in a first pass propagation through the pancake lens block (e.g., through the first pre-polarizer, the first compounder retarder, the partial (e.g., 50-50) reflector, the second compound retarder, and through the reflective polarizer to the human eye). In some embodiments, by using a compound design as described herein, where the compound retarders are centered to predominantly reduce the leakage light transmission at the peak photopic sensitivity point of the eye, these designs may be sufficient to provide a reduction in see-through ghost artifacts.

In another embodiment, the reduction of the effect of higher order optical artifacts (e.g., double-bounce ghosts) in the optical system may require additional considerations (e.g., compound retarder optimization). In particular, as described in connection with FIG. 7B, above, the double-bounce ghosts may refer to leakage light that is transmitted from the display to the eye in a second (or higher) pass through the optical system after being reflected by the reflective polarizer in the first pass (e.g., reflected by the first pre-polarizer, back through the second compound retarder, partially reflected by the partial reflector, through the second compound retarder a second time, and back through the reflective polarizer to the human eye). In some embodiments, such double-bounce ghost artifacts may be mitigated by designing one or more parameters associated with the second compound retarder (e.g., the second HW and the following retarder such as a QW) in the ROC architecture of the pancake lens block.

In particular, the first two retarders (e.g., the first two QWs) may be aligned to one another to act as a HW, while the third retarder (e.g., third QW) may be at an angle with respect to the HW. In particular, the first two retarders may have an optical axis orientation of approximately 14.8 degrees, while the third retarder may have an optical axis orientation of 73.7 degrees.

In some embodiments, the image contrast of the pancake lens block-based optical system (e.g., a head mounted display) may be improved by compensating for the effect of thickness direction residual retardance (Rth) (also referred to as out-of-plane retardance) in one or more of the optical components of the pancake lens block.

In an ROC pancake lens block as various described herein, it may be desirable to have broadband achromatic performance. This may require using one or more retarder films (e.g., for use in the compound retarders) to manage the polarization state of light traversing the pancake lens block. For a typical uniaxial retarder, the thickness direction index may be different from the average in-plane index (e.g., the index of refraction in the plane of a retarder film). Accordingly, one or more rays that project onto the thickness direction may see this additional residual retardance (Rth), which may impact the polarization state of light in a manner that depends upon both incidence angle and azimuth of the propagating light.

In some embodiments, the contrast and uniformity of the pancake lens block and the optical system in which the pancake lens block is used (e.g., a head mounted display) may be improved by compensating for this residual retardance, Rth. To do so, a material (e.g., a c-plate compensator) may be inserted in the optical path that has a thickness-direction retardance that is opposite to that of the retardance of the retarder material in the thickness direction. In this way, the net thickness-direction retardance of the retarder film and the c-plate compensator may be minimized. In some embodiments, a c-plate compensator may refer to a uniaxial birefringent optical element having its extraordinary axis oriented perpendicular to the plane of the plate (i.e., parallel to the direction of normally incident light). Further, a c-plate compensator may not provide any net retardation for normal-incident rays (i.e., normal-incident light is unaffected by the birefringence). In contrast, rays incident off-axis (i.e., at an angle to the extraordinary axis) may experience a net retardation that increases with incidence angle of incident light on the c-plate compensator.

In some embodiments, c-plate compensators may be used in connection with direct view displays (e.g., displays based on light-emitting diodes) to improve the off-axis performance of one or more optical elements in the direct view displays. In this case, the LC material may be a positive uniaxial with optic axis normal to the substrate in the dark-state (i.e. the extraordinary index is larger than the ordinary index), calling for a negative c-plate compensator (i.e. the extraordinary index normal to the layer is smaller than the ordinary in-plane index). In another embodiment, implementing a c-plate compensator in the ROC pancake lens block arbitrarily (e.g., randomly placing the c-plate compensator between optical elements of the pancake lens block) may not lead to any off-axis contrast improvement. In particular, the position of a first and second c-plate compensator in the ROC architecture may make a significant impact with respect to the off-axis contrast performance of the pancake lens block. In this instance, the retarder films used in the compound retarder are typically positive uniaxial with optic axis in the plane of the substrate. Because the average in-plane index exceeds that in the thickness direction, this may call for a positive c-plate compensator (i.e. the extraordinary index normal to the layer is larger than the ordinary in-plane index).

In some embodiments, the symmetry of the pancake lens block may affect the placement of c-plate compensators. For example, as shown in FIG. 7A, the ROC pancake lens block may include a first compound retarder 705 and a second compound retarder 713 that may be separated by a partial reflector 712. Further, in the ROC architecture, the compound retarders may each be composed of individual retarders such as QWPs (e.g., a first QWP 704, a second QWP 706, and a third QWP 708 in the first compound retarder 705 and similarly, a first QWP 716, a second QWP 718, and a third QWP 720 in the second compound retarder 713). In some embodiments, compensating for the Rth of each QWP (e.g., each uniaxial QWP retarder) in the compound retarders may be complex and potentially costly. Further, a c-plate compensator may not suffice at least because the in-plane projection of the optical axis may introduce retardation for any azimuthal angle of incident light when the light is incident off-normal. In particular, the projected optical axis of the compensator (e.g., c-plate compensator) may not coincide with the optical axis of the retarders (e.g., the QWPs) in the compound retarder.

Alternatively, a single c-plate compensator may be introduced between the compound retarders (e.g., between the first compound retarder 705 and the second compound retarder 713) at a location in the ROC system where the SOP is quasi-circular. To the extent that the composite Rth introduces an azimuth-independent retardation for light of off-normal incidence angles, a single c-plate compensator may be effective. In some embodiments, for a typical positive uniaxial retarder film, the value of Rth may be positive (e.g., because the average in-plane index (for example, via stretching) may exceed the average index in the thickness direction). Therefore, a positive c-plate compensator (i.e., one with Rth less than 0) may need to be used in order to minimize the net Rth. An increasing number of components in a compound retarder (e.g., an increasing number of QWPs) may result in an increase composite Rth; therefore, a corresponding increase in compensator retardation values may be needed.

Another consideration that the ROC structure may present is that light traversing the pancake lens may not merely propagate straight through the optical components; rather, the light may be reflected from various interfaces (e.g., interfaces between optical elements such as the reflective polarizer 724, the partial reflector 712, and the second compound retarder 713), and therefore, the light may be characterized as a folded beam. In particular, light may travel through the first compound retarder 705 one time but may travel through the second compound retarder 713 three times before exiting the pancake lens block.

Figure 8:
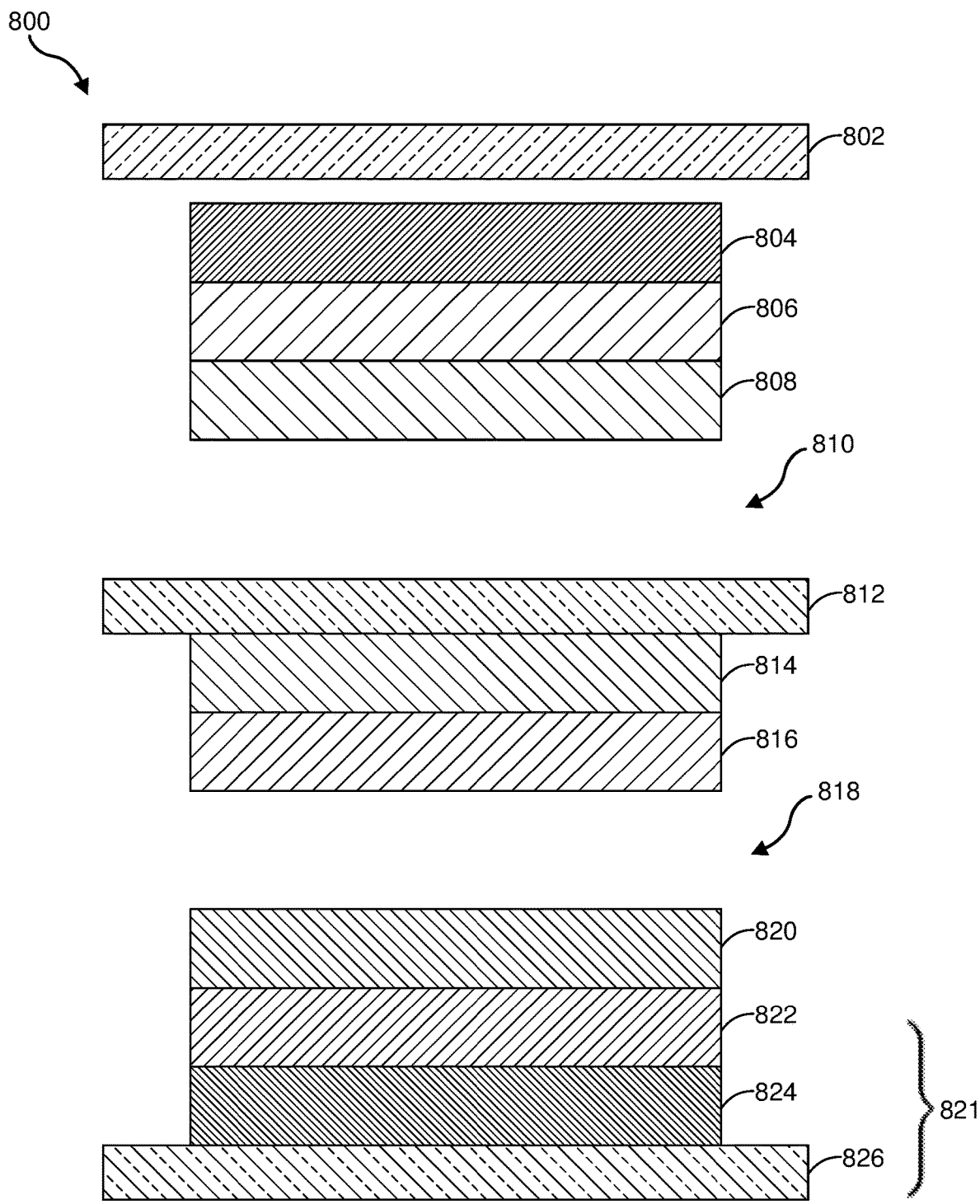
FIG. 8 shows a diagram of an example optical layout of a reverse-order crossed pancake lens block including c-plate compensators, in accordance with one embodiment.

In some embodiments, as shown in FIG. 8, compensation may be provided between the compound retarders (e.g., the first compound retarder 806 and the second compound retarder 816) in order to mitigate polarization distortion that may occur in the forward pass of the ROC structure. In another embodiment, one objective of the compensation may be to ensure that the ROC arrangement (i.e., an arrangement that leads to a Jones matrix that is an identity matrix) is maintained for off-normal rays of incident light, and therefore, that the original polarization of light is fully restored. This may be considered as an optimal c-plate retardation for the ROC pancake lens block.

Diagram 800 additionally shows a display 802 and a combination of a linear polarizer 804 and a first compound retarder 806 along with a first c-plate compensator 808. The diagram additionally illustrates a partial reflector 812 along with a combination of second c-plate compensator 814 and second compound retarder 816. The first c-plate compensator 808 may be separated from the partial reflector 812 by a distance 810, which may be a cavity filled with a material (e.g., a nanovoided material or an air gap). Similarly, the second compound retarder 816 and a reflective polarizer 820 may be separated by a distance 818, which may be a cavity filled with a material (e.g., a nanovoided material or an air gap). In one aspect, diagram 800 further shows an optional eye-reflection portion 821 that serves to reduce back reflections emanating from a user's eye. In particular, the eye-reflection portion 821 may include a polarizer 822, a third compound retarder 824, and an anti-reflective material 826 (e.g., a shaped antireflective lens).

When light is returned by the reflective polarizer 820 in the ROC structure, the light may undergo two passes (e.g., a double-pass) through the second compound retarder 816 (i.e., via the partial reflector 812), converting the wavelengths of interest to an orthogonal SOP in the round-trip. In so doing, the light may exit the cavity 818 (defined by the second compound retarder 816 and the reflective polarizer 820) and may be transmitted to the viewer. In some embodiments, if c-plate retardation were to be placed between the first compound retarder 806 and the partial reflector 812 only, the second compound retarder 816 may not receive any c-plate compensation in the double-pass propagation of light. In another embodiment, if the c-plate retardation were to be placed between the partial reflector 812 and the second compound retarder 816, the second compound retarder 816 may receive twice the c-plate compensation that the first compound retarder 806 receives. By subdividing the c-plate compensator such that a portion of the c-plate compensator 808 resides outside the cavity (formed by the two reflectors) and the remainder of the c-plate resides within the cavity as shown in FIG. 8, the amount of c-plate compensation received by the double-pass of the second compound retarder 820 may be controlled.

In some embodiments, the two c-plate compensators (e.g., first c-plate compensator 808 and second c-plate compensator 814) may be identical or nearly identical. For example, 1-1000 nm of compensation may be provided by the two c-plates compensators, each providing 1-1000 nm of compensation. In some embodiments, the first c-plate compensator 808 may be placed at the position where light is circularly polarized between the first compound retarder 806 and the partial reflector 812. The second c-plate compensator 814 may be placed adjacent to and before the second compound quarter wave retarder 816. As noted, the c-plate compensators may provide compensation that may be independent of azimuth. Accordingly, the c-plate compensators may be provided on circularly polarized light (which are also azimuth independent) to provide adequate compensation without distorting the polarization profile of the propagating light.

As noted, the compensation mechanism may be split into two parts: a first c-plate compensator 808 may compensate the ROC structure (e.g., the configuration of optical elements including the first compound retarder 806, the partial reflector 812, and the second compound retarder 816 that operate on light in the first pass) and the second c-plate compensator 814 may compensate for the double-pass of the second compound retarder 816. Furthermore, the c-plate compensators may be arranged at the point of symmetry in the optical path of the pancake lens block. Thus, the compensation scheme with the c-plate compensator may be arranged such that it works equally well on visual artifacts that arise from single-pass light traversal through the optical system as well as multiple-pass light traversals through the optical system (e.g., both see-through and double-bounce ghosts may be minimized).

Although the embodiments described above in relation to c-plate compensation may include two compound retarders in an ROC configuration where each compound retarder includes multiple (e.g., an odd number of) QWPs, alternative embodiments may include designs having two single-element retarders (e.g., two single QWPs) in series in an ROC configuration.

In some embodiments, a head-mounted display (HMD) may include a display (e.g., a liquid crystal display (LCD), a light-emitting diode (LED) display, an organic light-emitting diode (OLED) display, and the like). In some embodiments, an LCD display may need an analyzer that may determine a polarization of light to transmit from the display (e.g., to another optical element or to a viewer). In some embodiments, an OLED display may need a "ghost-busting" element such that light returned by the partial reflector (e.g., partial reflector 712 shown and described in connection with FIG. 7A, above) to a display does not create stray light that reduces contrast. In some embodiments, the term ghost-buster may refer to a circular-polarizer that converts down-stream specular reflections to an orthogonal SOP in a round-trip pass of light through the pancake lens block, which may then be absorbed by a polarizer. In some embodiments, such native display elements (e.g., an analyzer, a ghostbuster, and the like) of the display may be used as pre-polarizers for the pancake lens block described herein.

Figure 9:
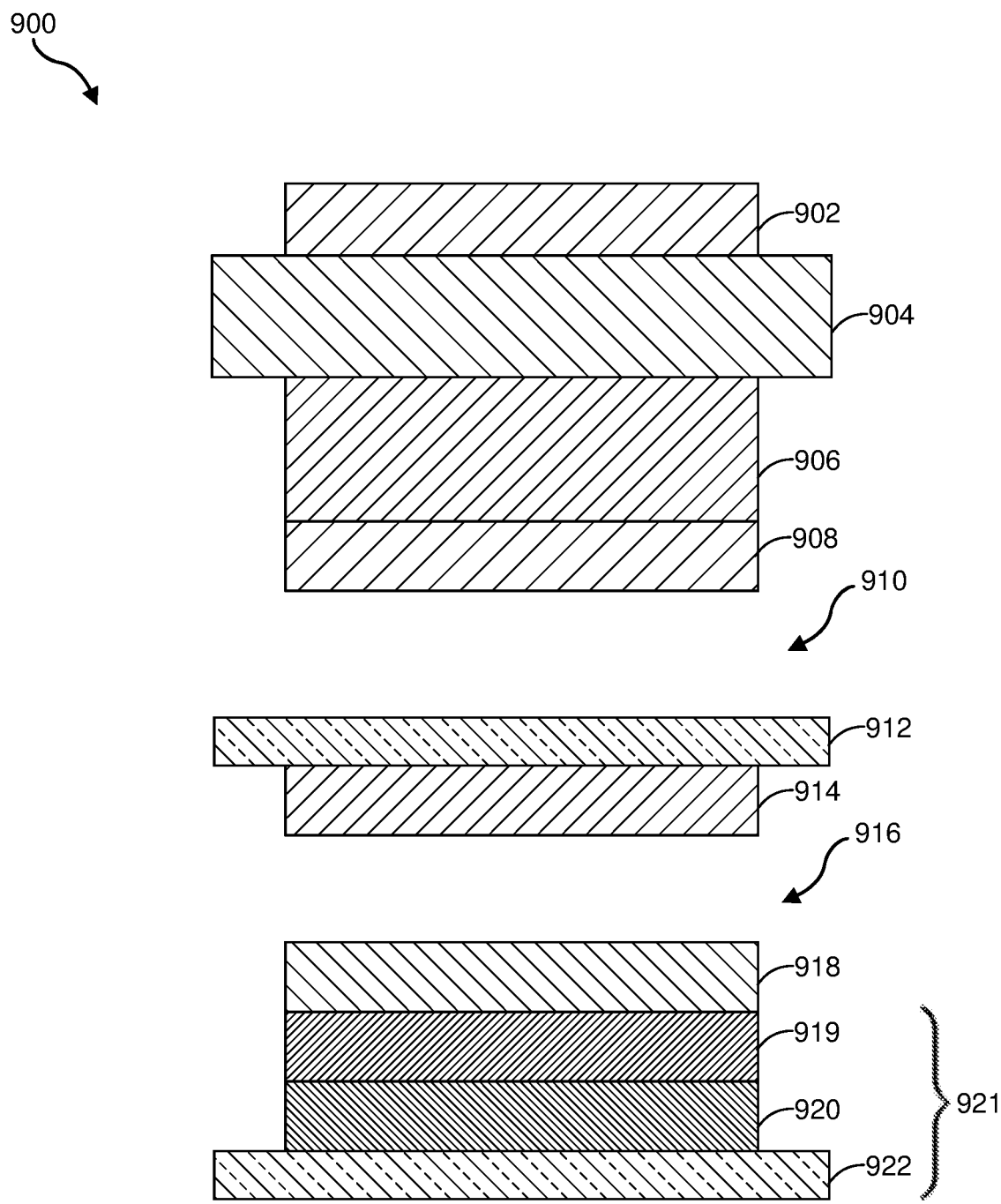
FIG. 9 shows a diagram of an example optical layout of a reverse-order crossed pancake lens block including a display polarizer, in accordance with one embodiment.

FIG. 9 shows a diagram of an example optical layout of a reverse-order crossed pancake lens block including a display polarizer, in accordance with one embodiment. As shown in diagram 900, one or more of a display polarizer 902, a display polarization management system 904, and/or a display analyzer 906 may be used as a polarizer of the pancake lens block described herein. In some embodiments, by also using display analyzer 906 as a polarizer (e.g., a circular polarizer), the system cost and/or weight may be reduced (e.g., fewer components) and the system performance (e.g. contrast) may be increased (e.g., fewer interfaces leading to fewer Fresnel reflections).

In some embodiments, a polarization axis of the display analyzer 906 may need to match the polarization axis and/or a first compound retarder 908 (e.g., the individual retarders, for example, the QWPs) design of the pancake lens. The optical axes of the optical system (e.g., the optical axes of the pancake lens block including the first compound retarder 908 and a second compound retarder 914) may be tied to the axes of the display (not shown). Accordingly, the polarization axes of the optical system may be rotated such that the corners are positioned for the highest level of contrast. Moreover, this degree of freedom to rotate a polarizer (e.g., display polarizer 902) with respect to the analyzer of a display may be desirable, but introducing an interface may not be preferable since the interface may introduce additional reflections (e.g., Fresnel reflections).

In some embodiments, a display analyzer 906 may be used in connection with a circular polarizer (e.g. a first compound retarder 908 including QWPs). Accordingly, light emitted by the display analyzer 906 may be linearly polarized, and this linearly polarized light may be incident on a circular polarizer to make the light circularly polarized. Moreover, the circularly polarized light may then be converted back to linear polarization (e.g., by a second compound retarder 914) for highest contrast in the optical system.

Diagram 900 additionally shows that the first compound retarder 908 and a partial reflector 912 along with the second compound retarder 914 may be separated by a distance 910, which may be a cavity filled with a material (e.g., a nanovoided material or an air gap). Similarly, the second compound retarder 914 and a reflective polarizer 918 may be separated by a distance 916, which may be a cavity filled with a material (e.g., a nanovoided material or an air gap). In one aspect, diagram 900 further shows an optional eye-reflection portion 921 that serves to reduce back reflections emanating from a user's eye. In particular, the eye-reflection portion 921 may include a polarizer 919, a third compound retarder 920, and an anti-reflective material 922 (e.g., a shaped antireflective lens).

Although the embodiments described herein in connection with a display analyzer further include two compound retarders in an ROC configuration where each compound retarder includes multiple (e.g., an odd number of) QWPs, alternative embodiments may include designs having two single-element retarders (e.g., two single QWPs) in series in an ROC configuration.

Figure 10:
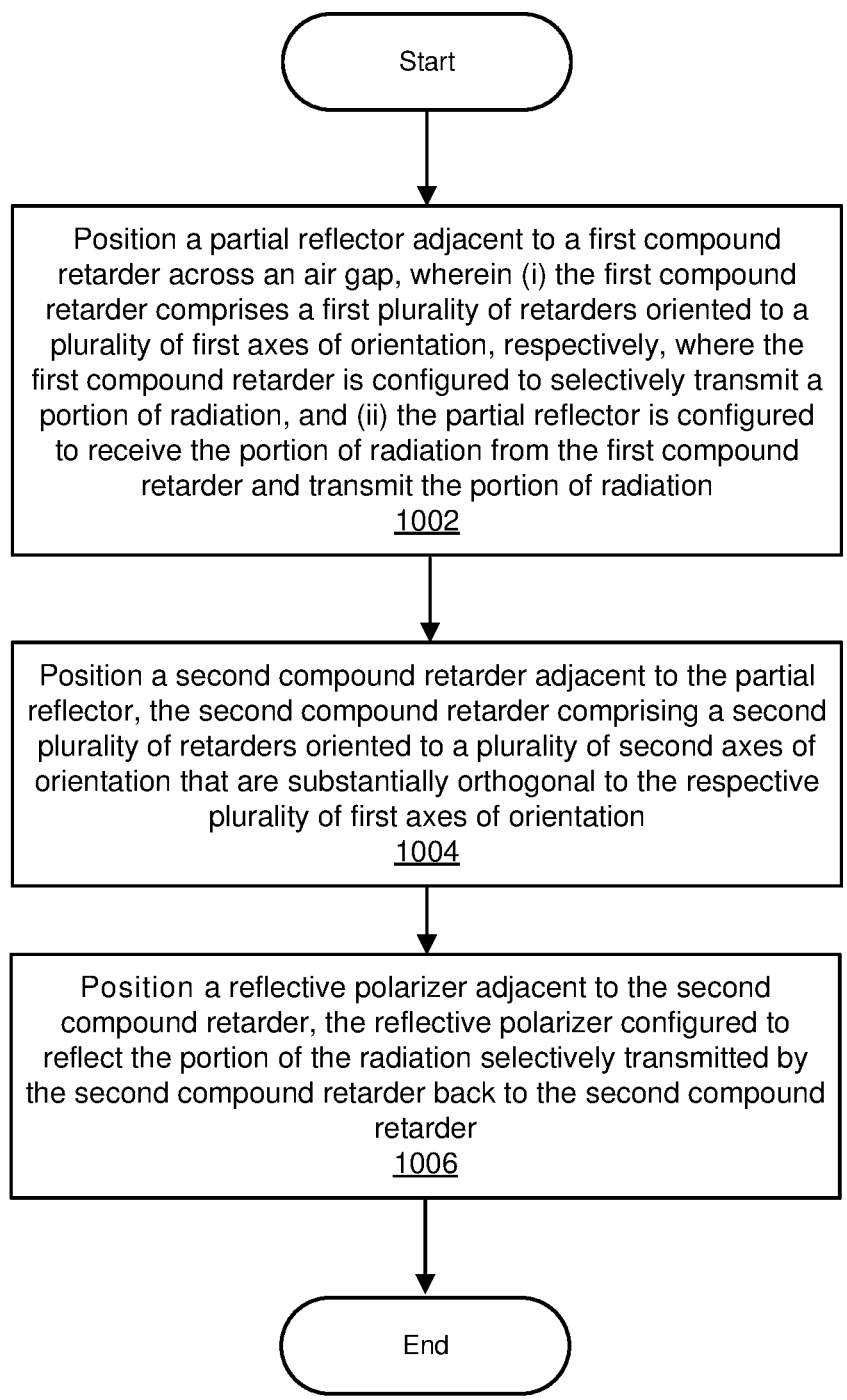
FIG. 10 shows a flow diagram of an example method for assembling a reverse order crossed pancake lens block, in accordance with example embodiments of the disclosure.

FIG. 10 shows a flow diagram of an example method 1000 for assembling a reverse order crossed pancake lens block, in accordance with example embodiments of the disclosure. At step 1002, a partial reflector may be positioned adjacent to a first compound retarder across an air gap, in accordance with various embodiments disclosed herein. The first compound retarder may include a first plurality of retarders oriented to a plurality of first axes of orientation, respectively. Additionally, the partial reflector may be configured to receive the portion of radiation from the first compound retarder and transmit the portion of radiation. In some embodiments, the first compound retarder may be configured to selectively transmit a portion of radiation. In an example, the first compound retarder may include QWPs (e.g., three QWPs) that transform the polarization of received light. The first compound retarder may have a compound optic axis oriented at approximately 45 degrees relative to incident linearly polarized light (e.g., from an electronic display and/or from a linear polarizer associated with the electronic display) such that first compound retarder converts linearly polarized light into circularly polarized light. As noted, the first compound retarder may include multiple retarders, such as QWPs. In another embodiment, QWPs may be made of birefringent materials such as quartz, organic stretched material sheets, or liquid crystal. In one embodiment, the QWPs may be designed to be optimized such that the dependence of the retardance induced by a given retarder remains close to a quarter of a wave independently of the wavelength and the angle of incidence on the QWP. In at least one embodiment, the partial reflector may be referred to as a mirrored surface herein and may be partially reflective to reflect a portion of the received light. In some embodiments, the partial reflector may be configured to transmit approximately 50% of incident light and reflect approximately 50% of incident light.

At step 1004, a second compound retarder may be positioned adjacent to the partial reflector, the second compound retarder including a second plurality of retarders oriented to a plurality of second axes of orientation that are substantially orthogonal to the respective plurality of first axes of orientation, in accordance with various embodiments disclosed herein. Moreover, the second compound retarder may be configured to selectively transmit the portion of radiation from the partial reflector. As noted, in some embodiments, the compound retarders (e.g., first compound retarder and second compound retarder) may include three QWPs. The first two QWPs (with respect to the display side) of the compound retarders may collectively act as a half-wave (HW) retarder of light incident on the third QWP of the compound retarders. In some embodiments, such an arrangement may ensure a match between the center wavelength of the HW retarder and the QW retarder. In some embodiments, a pancake lens configuration whereby the first two QWPs act as a HW retarder to the third QWP in each compound retarder may be referred to herein as a HW-compensated QWP.

At step 1006, a reflective polarizer may be positioned adjacent to the second compound retarder, the reflective polarizer configured to reflect the portion of the radiation selectively transmitted by the second compound retarder back to the second compound retarder, in accordance with various embodiments disclosed herein. Moreover, the where the partial reflector reflects a second portion of the radiation from the second compound retarder back to the reflective polarizer. In another aspect, the reflective polarizer may represent a polarization-sensitive, partially reflective mirror configured to reflect received light of a first linear polarization and transmit received light of a second linear polarization. For example, reflective polarizer may be a wire grid polarizer configured to reflect linearly polarized light with a polarization direction in the x-direction, and pass light that is linearly polarized in the y-direction.

Figure 11:
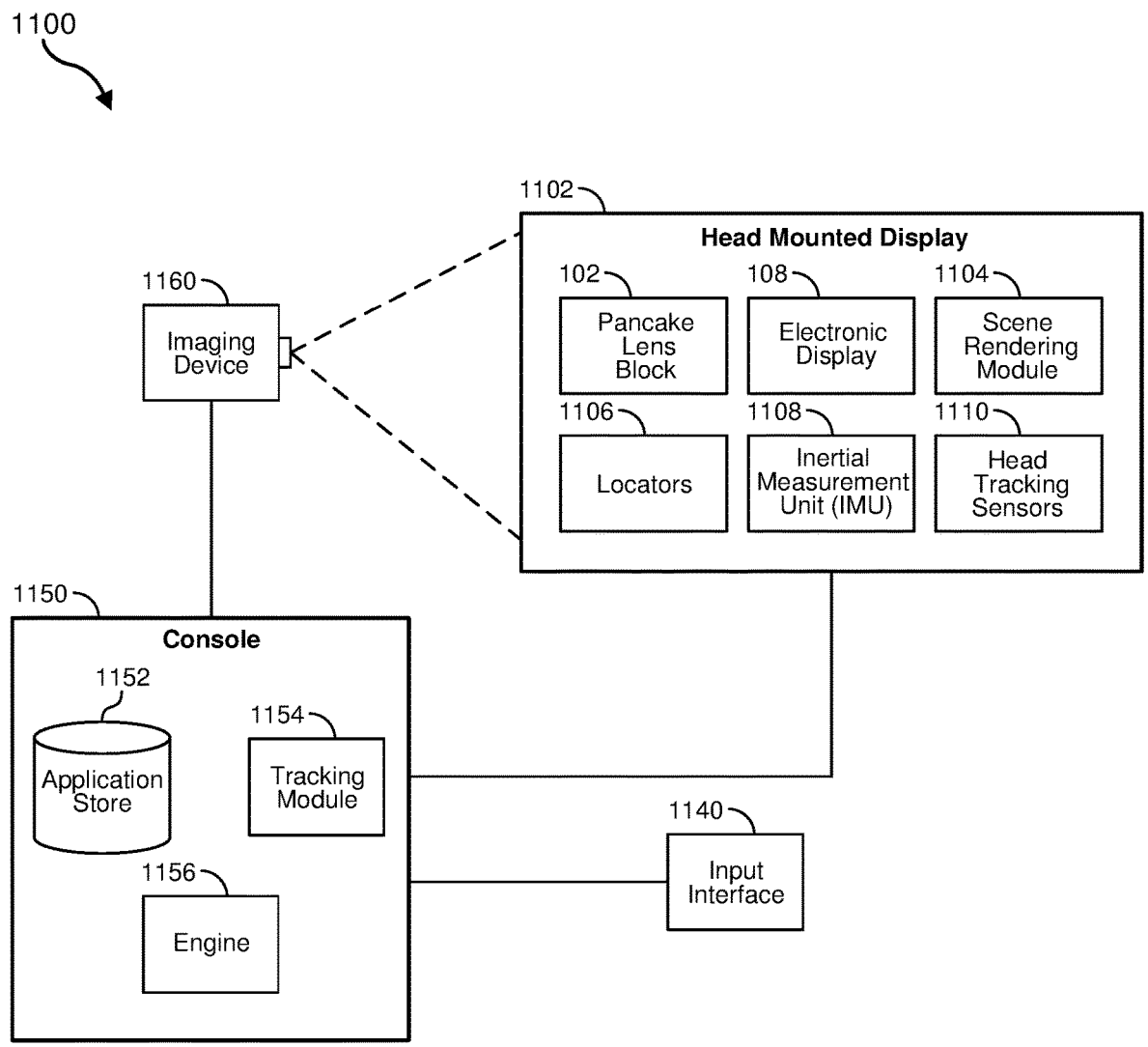
FIG. 11 shows a diagram of an example system environment in which a head mounted display with a pancake lens operates, in accordance with at least one embodiment.

FIG. 11 is a block diagram of an exemplary system environment 1100 including an HMD 1102 that includes pancake lens block 102. System environment 1100 shown by FIG. 11 includes an HMD 1102, an imaging device 1160, and an input interface 1140 that are each coupled to a console 1150. While FIG. 11 shows an example system 1100 including one HMD 1102, one imaging device 1160, and one input interface 1140, in other embodiments any suitable number of these components may be included in the system 1100. For example, there may be multiple HMDs 1102, each having an associated input interface 1140 and being monitored by one or more imaging devices 1160, with each HMD 1102, input interface 1140, and imaging device 1160 communicating with the console 1150. In alternative configurations, different and/or additional components may be included in the system environment 1100. The system 1100 may operate in a system environment, an augmented reality (AR) system environment, a mixed reality (MR) system environment, or some combination thereof. In some embodiments, at least one of imaging device 1160, console 1150, and/or input interface 1140 may be included within HMD 1102 and/or may be external to HMD 1102.

HMD 1102 may present content to a user. Example content may include images, video, audio, or some combination thereof. Audio content may be presented via a separate device (e.g., speakers and/or headphones) external to HMD 1102 that receives audio information from HMD 1102, console 1150, or both. In some embodiments, HMD 1102 may include pancake lens block 102, an electronic display 108, locators 1106, an internal measurement unit (IMU) 1108, head tracking sensors 1110, and/or a scene rendering module 1104. In some embodiments, the HMD 1102 may present virtual reality (VR) elements, augmented reality (AR) elements, mixed reality (MR) elements, or some combination thereof to a user. In the AR and/or MR embodiments, the HMD 1102 may augment views of a physical, real-world environment with computer-generated elements (e.g., images, video, sound, etc.).

Electronic display screen 108 may present visual information (i.e., image light) from an electronic signal. The electronic display 108 may be, e.g., a liquid crystal display (LCD), an organic light emitting diode (OLED) display, an active-matrix organic light-emitting diode display (AMO-LED), some type of flexible display, some combination thereof, and/or any other suitable type of emissive display. In some embodiments, electronic display screen 108 may include a linear polarizer and/or may admit light that is linearly polarized.

Pancake lens block 102 may direct light from electronic display 108 to an exit pupil for viewing by a user using one or more optical elements in addition to two curved optical elements (e.g., front optical element 104 and back optical element 106 described in reference to FIGS. 1-2). For example, the one or more optical elements may include at least one of apertures, Fresnel lenses, convex lenses, concave lenses, filters, and so forth, and may include combinations of different optical elements. In some embodiments, one or more of the optical elements of pancake lens block 102 may have one or more coatings, such as anti-reflective coatings. Magnification of the image light by pancake lens block 102 may allow electronic display 108 to be physically smaller, weigh less, and consume less power than larger displays. Additionally, magnification of the image light may increase a field of view of the displayed content. For example, the field of view of the displayed content may be such that the displayed content is presented using almost all (e.g., 150 degrees diagonal), and in some cases all, of the user's field of view.

Locators 1106 may represent objects located in specific positions on HMD 1102 relative to one another and relative to a specific reference point on HMD 1102. Locators 1106 may be, for example, a light emitting diode (LED), a corner cube reflector, a reflective marker, a type of light source that contrasts with an environment in which HMD 1102 operates, or some combination thereof. Active locators 1106 (e.g., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 1106 may be located beneath an outer surface of HMD 1102, which is transparent to the wavelengths of light emitted or reflected by locators 1106 or is thin enough to not substantially attenuate the wavelengths of light emitted or reflected by locators 1106. Further, the outer surface or other portions of HMD 1102 may be opaque in the visible band of wavelengths of light. Thus, locators 1106 may emit light in the IR band while under an outer surface of HMD 1102 that is transparent in the IR band but opaque in the visible band.

IMU 1108 may represent an electronic device that generates fast calibration data based on measurement signals received from one or more of head tracking sensors 1110, which generate one or more measurement signals in response to motion of HMD 1102. Examples of head tracking sensors 1110 include accelerometers, gyroscopes, magnetometers, other sensors suitable for detecting motion, correcting error associated with IMU 1108, or some combination thereof. Head tracking sensors 1110 may be located external to IMU 1108, internal to IMU 1108, or some combination thereof.

Based on the measurement signals from head tracking sensors 1110, IMU 1108 may generate fast calibration data indicating an estimated position of HMD 1102 relative to an initial position of HMD 1102. For example, head tracking sensors 1110 may include multiple accelerometers to measure translational motion (forward/back, up/down, left/right) and multiple gyroscopes to measure rotational motion (e.g., pitch, yaw, and roll). IMU 1108 may, for example, rapidly sample the measurement signals and calculate the estimated position of HMD 1102 from the sampled data. For example, IMU 1108 may integrate measurement signals received from the accelerometers over time to estimate a velocity vector and integrate the velocity vector over time to determine an estimated position of a reference point on HMD 1102. The reference point may represent a point that may be used to describe the position of HMD 1102. While the reference point may generally be defined as a point in space, in various embodiments, reference point may be defined as a point within HMD 1102 (e.g., a center of the IMU 1108). Alternatively, IMU 1108 may provide the sampled measurement signals to console 1150, which determines the fast calibration data.

IMU 1108 may additionally receive one or more calibration parameters from console 1150. As further discussed below, the one or more calibration parameters may be used to maintain tracking of HMD 1102. Based on a received calibration parameter, IMU 1108 may adjust one or more IMU parameters (e.g., sample rate). In some embodiments, certain calibration parameters may cause IMU 1108 to update an initial position of the reference point to correspond to a next calibrated position of the reference point. Updating the initial position of the reference point as the next calibrated position of the reference point may help reduce accumulated error associated with determining the estimated position. This accumulated error, also referred to as drift error, may cause the estimated position of the reference point to "drift" away from the actual position of the reference point over time.

Scene rendering module 1104 may receive content for the virtual scene from engine 1156 and provide the content for display on electronic display 108. Additionally, scene rendering module 1104 may adjust the content based on information IMU 1108 and head tracking sensors 1110. For example, upon receiving the content from engine 1156, scene rendering module 1104 may adjust the content based on the predicted state (i.e., eye position and focal length) of pancake lens block 102 received from a focus prediction module. Additionally, scene rendering module 1104 may determine a portion of the content to be displayed on electronic display 108 based on one or more of tracking module 1154, head tracking sensors 1110, or IMU 1108, as described further below.

Imaging device 1160 may generate slow calibration data in accordance with calibration parameters received from console 1150. Slow calibration data may include one or more images showing observed positions of locators 1106 that are detectable by imaging device 1160. Imaging device 1160 may include one or more cameras, one or more video cameras, other devices capable of capturing images including one or more locators 1106, or some combination thereof. Additionally, imaging device 1160 may include one or more filters (e.g., for increasing signal to noise ratio). Imaging device 1160 may be configured to detect light emitted or reflected from locators 1106 in a field of view of imaging device 1160. In embodiments where locators 1106 include passive elements (e.g., a retroreflector), imaging device 1160 may include a light source that illuminates some or all of locators 1106, which retro-reflect the light towards the light source in imaging device 1160. Slow calibration data may be communicated from imaging device 1160 to console 1150, and imaging device 1160 may receive one or more calibration parameters from console 1150 to adjust one or more imaging parameters (e.g., focal length, focus, frame rate, ISO, sensor temperature, shutter speed, aperture, etc.).

Input interface 1140 may represent a device that allows a user to send action requests to console 1150. An action request may represent a request to perform a particular action. For example, an action request may be to start or end an application or to perform a particular action within the application. Input interface 1140 may include one or more input devices. Example input devices include a keyboard, a mouse, a game controller, and/or any other suitable device for receiving action requests and communicating the received action requests to console 1150. An action request received by input interface 1140 may be communicated to console 1150, which performs an action corresponding to the action request. In some embodiments, input interface 1140 may provide haptic feedback to the user in accordance with instructions received from console 1150. For example, haptic feedback may be provided by the input interface 1140 when an action request is received and/or console 1150 communicate instructions to input interface 1140 causing input interface 1140 to generate haptic feedback when console 1150 performs an action.

Console 1150 may provide content to HMD 1102 for presentation to the user in accordance with information received from imaging device 1160, HMD 1102, or input interface 1140. In the example shown in FIG. 11, console 1150 may include an application store 1152, a tracking module 1154, and an engine 1156. Some embodiments of console 1150 may have different or additional modules than those described in conjunction with FIG. 11. Similarly, the functions further described below may be distributed among components of console 1150 in a different manner than is described herein.

Application store 1152 may store one or more applications for execution by console 1150. An application may represent a group of instructions, that when executed by a processor, generates content for presentation to the user. Content generated by an application may be in response to inputs received from the user via movement of HMD 1102 or interface device 1140. Examples of applications include gaming applications, conferencing applications, video playback application, or other suitable applications.

Tracking module 1154 may calibrate the system using one or more calibration parameters and may adjust one or more calibration parameters to reduce error in determining position of HMD 1102. For example, tracking module 1154 may adjust the focus of imaging device 1160 to obtain a more accurate position for observed locators 1106 on HMD 1102. Moreover, calibration performed by tracking module 1154 may also account for information received from IMU 1108. Additionally, if tracking of HMD 1102 is lost (e.g., imaging device 1160 loses line of sight of at least a threshold number of locators 1106), tracking module 1154 may re-calibrate some or all of the system components.

Additionally, tracking module 1154 may track the movement of HMD 1102 using, for example, slow calibration information from imaging device 1160 and may determine positions of a reference point on HMD 1102 using observed locators from the slow calibration information and a model of HMD 1102. Tracking module 1154 may additionally or alternatively determine positions of the reference point on HMD 1102 using position information from fast calibration information from IMU 1108 on HMD 1102. Additionally, tracking module 1154 may use portions of the fast calibration information, the slow calibration information, some combination thereof, and/or any other suitable positional information to predict a future location of HMD 1102, which is provided to engine 1156.

Engine 1156 may execute applications within the system and receive position information, acceleration information, velocity information, predicted future positions, some combination thereof, and/or any other suitable data for HMD 1102 from tracking module 1154. Based on the received information, engine 1156 may determine content to provide to HMD 1102 for presentation to the user, such as a virtual scene. For example, if the received information indicates that the user has looked to the left, engine 1156 may generate content for HMD 1102 that includes optical elements or tracks the user's movement in a virtual environment. Additionally or alternatively, engine 1156 may perform an action within an application executing on console 1150 in response to an action request received from the input interface 1140 and provide feedback to the user that the action was performed. The provided feedback may, for example, be visual or audible feedback via HMD 1102 and/or haptic feedback via input interface 1140.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

As detailed above, the computing devices, display devices, and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A pancake lens block comprising:
   a first compound retarder comprising a stack of at least three quarter wave plates whose optical axes are oriented in a specific order relative to one another, where the first compound retarder is configured to selectively transmit a portion of radiation from a radiation source;
   a partial reflector is configured to receive the portion of radiation from the first compound retarder and transmits the portion of radiation;
   a second compound retarder comprising an additional stack of at least three quarter wave plates whose optical axes are orthogonal and oriented in a different order that reversely maps to the specific order, where the second compound retarder is configured to selectively transmit the portion of radiation from the partial reflector;
   a reflective polarizer configured to reflect the portion of radiation selectively transmitted by the second compound retarder back to the partial reflector through the second compound retarder, where the partial reflector reflects a second portion of the radiation from the second compound retarder back to the reflective polarizer; and an eye-reflection portion configured to:
receive the second portion of radiation from the reflective polarizer after the second portion of radiation has passed through the second compound retarder; and
reduce back reflections emanating from an eye of a user, the eye-reflection portion comprising:
a polarizer;
a third compound retarder comprising another stack of at least three quarter wave plates; and
an anti-reflective material.

2. The pancake lens block of claim 1, further comprising a display polarizer that polarizes the radiation from the radiation source before the radiation reaches the first compound retarder, and wherein the portion of radiation selectively transmitted from the first compound retarder has a circular polarization state.

3. The pancake lens block of claim 1, wherein the at least three quarter wave plates of the stack include a first quarter wave plate and a second quarter wave plate that collectively serve as a half wave plate to a third quarter wave plate.

4. The pancake lens block of claim 3, wherein:
the first quarter wave plate and the second quarter wave plate have axes of orientation that are parallel to one another; and
the third quarter wave plate has an axis of orientation that is approximately 58.9 degrees relative to the axes of orientation of the first and second quarter wave plates.

5. The pancake lens block of claim 1, wherein at least one of the first compound retarder or the second compound retarder comprises a dispersion-controlled quarter-wave retarder.

6. The pancake lens block of claim 5, wherein the dispersion-controlled quarter-wave retarder comprises a co-polymer of polycarbonate and polystyrene.

7. The pancake lens block of claim 1, wherein at least one of the first compound retarder or the second compound retarder comprises a cyclic olefin material.

8. The pancake lens block of claim 1, wherein the first compound retarder has a first surface facing a display and a second surface facing the partial reflector, and the second compound retarder has a first surface facing the partial reflector and a second surface facing the reflective polarizer, and wherein the pancake lens block further comprises a first c-plate coupled to the second surface of the first compound retarder and a second c-plate coupled to the first surface of the second compound retarder.

9. The pancake lens block of claim 8, wherein the first c-plate has a first retardation value and the second c-plate has a second retardation value that is substantially equal to the first retardation value.

10. The pancake lens block of claim 9, wherein the first retardation value and the second retardation value increase with an increasing number of components in the first compound retarder and an increasing number of components in the second compound retarder, respectively.

11. The pancake lens block of claim 1, wherein the first compound retarder is coupled to a display polarizer of a display.

12. The pancake lens block of claim 11, wherein the display polarizer comprises a linear polarizer and a polarization axis of the display polarizer is matched to a polarization axis of the first compound retarder.

13. The pancake lens block of claim 11, wherein the display polarizer is coupled to the first compound retarder, the display polarizer and the first compound retarder collectively serve as a circular polarizer.

14. The pancake lens block of claim 1, wherein the anti-reflective material comprises a shaped anti-reflective lens.

15. A head mounted display (HMD) comprising:
an electronic display configured to emit light; and
a pancake lens block comprising:
a first compound retarder comprising a stack of at least three quarter wave plates whose optical axes are oriented in a specific order relative to one another, where the first compound retarder is configured to selectively transmit a portion of the emitted light;
a partial reflector configured to receive the portion of emitted light from the first compound retarder and transmits the portion of emitted light;
a second compound retarder comprising an additional stack of at least three quarter wave plates whose optical axes are orthogonal and oriented in a different order that reversely maps to the specific order, where the second compound retarder is configured to selectively transmit the portion of emitted light from the partial reflector;
a reflective polarizer configured to reflect the portion of emitted light selectively transmitted by the second compound retarder back to the second compound retarder, where the partial reflector reflects a second portion of emitted light from the second compound retarder back to the reflective polarizer; and
an eye-reflection portion configured to:
receive the second portion of emitted light from the reflective polarizer after the second portion of emitted light has passed through the second compound retarder; and
reduce back reflections emanating from an eye of a user, the eye-reflection portion comprising:
a polarizer;
a third compound retarder comprising another stack of at least three quarter wave plates; and
an anti-reflective material.

16. The HMD of claim 15, wherein at least one of the first compound retarder or the second compound retarder comprises a dispersion-controlled quarter-wave retarder.

17. The HMD of claim 15, wherein the first compound retarder has a first surface facing the electronic display and a second surface facing the partial reflector, and the second compound retarder has a first surface facing the partial reflector and a second surface facing the reflective polarizer, and wherein the pancake lens block further comprises a first c-plate coupled to the second surface of the first compound retarder and a second c-plate coupled to the first surface of the second compound retarder.

18. A method of assembling a pancake lens block, the method comprising:
positioning a partial reflector adjacent to a first compound retarder across an air gap, wherein:
the first compound retarder comprises a stack of at least three quarter wave plates whose optical axes are oriented in a specific order relative to one another, where the first compound retarder is configured to selectively transmit a portion of radiation from a radiation source; and
the partial reflector is configured to receive the portion of radiation from the first compound retarder and transmit the portion of radiation;
positioning a second compound retarder adjacent to the partial reflector, the second compound retarder comprising an additional stack of at least three quarter wave plates whose optical axes are orthogonal and oriented in a different order that reversely maps to the specific order, where the second compound retarder is configured to selectively transmit the portion of radiation from the partial reflector;

positioning a reflective polarizer adjacent to the second compound retarder, the reflective polarizer configured to reflect the portion of radiation selectively transmitted by the second compound retarder back to the second compound retarder, where the partial reflector reflects a second portion of the radiation from the second compound retarder back to the reflective polarizer; and positioning an eye-reflection portion adjacent to the reflective polarizer, the eye-reflection portion configured to:
- receive the second portion of radiation from the reflective polarizer after the second portion of radiation has passed through the second compound retarder; and
- reduce back reflections emanating from an eye of a user, the eye-reflection portion comprising:
  - a polarizer;
  - a third compound retarder comprising another stack of at least three quarter wave plates; and
  - an anti-reflective material.

\* \* \* \* \*